US012780744B2

(12) United States Patent
Featherstone et al.

(10) Patent No.: US 12,780,744 B2
(45) Date of Patent: Nov. 3, 2026

(54) PROCESS AND CIRCUIT FOR PRODUCING ENHANCED MANGANESE-ZINC FILTER CAKE COMPOSITIONS WITH REDUCED CHLORIDE CONCENTRATIONS

(71) Applicant: ENERGYSOURCE MINERALS, LLC, Carlsbad, CA (US)

(72) Inventors: John L. Featherstone, El Centro, CA (US); Christian J. Calvert, El Centro, CA (US)

(73) Assignee: ENERGYSOURCE MINERALS, LLC, Carlsbad, CA (US)

( * ) Notice: Subject to any disclaimer, the term of this patent is extended or adjusted under 35 U.S.C. 154(b) by 0 days.

(21) Appl. No.: 19/354,367

(22) Filed: Oct. 9, 2025

(65) Prior Publication Data

US 2026/0035310 A1 Feb. 5, 2026

Related U.S. Application Data

(63) Continuation-in-part of application No. 19/088,985, filed on Mar. 24, 2025.

(Continued)

(51) Int. Cl.

*C04B 35/00* (2006.01)
*B01D 29/78* (2006.01)

(Continued)

(52) U.S. Cl.

CPC ........ *C04B 35/62655* (2013.01); *B01D 29/78* (2013.01); *B01D 29/84* (2013.01);

(Continued)

(58) Field of Classification Search

CPC .............. C04B 35/62655; C04B 35/01; C04B 35/62675; C04B 2235/3262;

(Continued)

(56) References Cited

U.S. PATENT DOCUMENTS 9,580,770 B2 2/2017 Bhaduri et al.
10,017,837 B2 7/2018 Bhaduri et al.

(Continued)

FOREIGN PATENT DOCUMENTS

EP 4491589 A1 1/2025

OTHER PUBLICATIONS

Kinnarinen Teemu et al: "Removal of chloride from fly ash produced in hazardous waste incineration by leaching and displacement washing in a vertical filter press", Waste Management and Research, vol. 31, No. 2, Jan. 11, 2013 (Jan. 11, 2013), pp. 178-186.

(Continued)

*Primary Examiner* — James E Mcdonough
(74) *Attorney, Agent, or Firm* — Crowe & Dunlevy, P.C.

(57) ABSTRACT

This disclosure pertains to a process and circuit for producing enhanced manganese-zinc filter cake compositions, and more specifically to a wash process and circuit that produces manganese concentrations of 36-45 wt. % and zinc concentrations of 15-17 wt. % while lowering chloride content to below 3 wt. %. The process and circuit involve sequential washing, drying, repulping, and dewatering of polymetallic filter cakes derived from saline feedstocks, facilitating effective downstream recovery of refined manganese and zinc products.

26 Claims, 12 Drawing Sheets

Related U.S. Application Data

(60) Provisional application No. 63/569,202, filed on Mar. 24, 2024.

(51) Int. Cl.
*B01D 29/84* (2006.01)
*C04B 35/01* (2006.01)
*C04B 35/626* (2006.01)
*C22B 3/02* (2006.01)

(52) U.S. Cl.
CPC ........ *C04B 35/01* (2013.01); *C04B 35/62675* (2013.01); *C22B 3/02* (2013.01); *C04B 2235/3262* (2013.01); *C04B 2235/3284* (2013.01); *C04B 2235/444* (2013.01); *C04B 2235/606* (2013.01)

(58) Field of Classification Search
CPC ...... C04B 2235/3284; C04B 2235/444; C04B 2235/606; B01D 29/78; B01D 29/84; C22B 3/02
USPC ....................................................... 106/286.6
See application file for complete search history.

(56) References Cited

U.S. PATENT DOCUMENTS

| | | | | |
|---|---|---|---|---|
| 2016/0289792 | A1 | 10/2016 | Bhaduri et al. | |
| 2020/0189925 | A1 * | 6/2020 | Featherstone .......... | C01D 15/08 |

OTHER PUBLICATIONS

Skrzekut Tomasz et al: "Studies of Selective Recovery of Zinc and Manganese from Alkaline Batteries Scrap by Leaching and Precipitation", Materials, vol. 15, No. 11, Jun. 2, 2022 (Jun. 2, 2022), p. 3966.
Warren Ian: "Techno-Economic Analysis of Lithium Extraction from Geothermal Brines", May 31, 2021 (May 31, 2021), pp. 1-48.
Extended European Search Report for European Patent Application No. 25193736.3, dated Feb. 27, 2026, 12 pages.
Perkins, E.C., "Caustic Leaching of Manganese Flotation Concentrate from Artillery Peak, Ariz", United States Department of the Interior, Jun. 1957, total 24 pages. (Year: 1957).
Svarovsky, L., "Solid-Liquid Separation", 2001, Butterworth-Heinemann, Fourth Edition. 335-348, 442-475. (Year: 2001).
Non-Final Office Action for U.S. Appl. No. 19/088,985, dated Jun. 24, 2026, 30 pages.

* cited by examiner

PROCESS AND CIRCUIT FOR PRODUCING ENHANCED MANGANESE-ZINC FILTER CAKE COMPOSITIONS WITH REDUCED CHLORIDE CONCENTRATIONS

CROSS-REFERENCE TO RELATED APPLICATIONS

This application is a continuation-in-part of U.S. patent application Ser. No. 19/088,985 filed Mar. 24, 2025, which claims the benefit of U.S. Provisional Patent Application No. 63/569,202 filed Mar. 24, 2024, and each of the foregoing applications is incorporated by reference in its entirety into this document as if fully set out at this point.

BACKGROUND OF THE INVENTION

1. Field of the Invention

The subject matter disclosed herein relates to a process for producing enhanced manganese-zinc filter cake compositions and, more particularly, to processes and circuits designed to reduce chloride content in the filter cake to facilitate improved downstream metal recovery. The enhanced filter cake compositions can be processed to extract zinc, manganese, or both.

2. Description of the Related Art

Polymetallic filter cakes generated in mineral processing and hydrometallurgical operations typically retain between 5 and 25 weight percent of soluble chloride salts, concentrations that can surpass 100,000 mg/kg in certain cases. These residual chlorides not only hinder downstream metal recovery but also contribute to equipment corrosion and reduce the quality of the final product. Furthermore, thorough removal of chlorides from filter cake materials is an important preparatory step in processes focused on recovering metals such as zinc and manganese.

Saline feedstocks for polymetallic precipitation encompass a broad spectrum of sources, including geothermal brines, oilfield produced waters, salt-lake brines, mining process waters, tailings pond liquors, desalination concentrates, and various industrial saline waste streams. Such feedstocks commonly exhibit total dissolved solids (TDS) ranging from 10,000 to over 300,000 ppm, with metal concentrations that vary according to geological and operational parameters. However, the diverse chemistry and high salinity of these brines present considerable challenges for chloride management.

Bound oxychloride complexes frequently persist within the filter cake matrix, necessitating additional wash cycles or stronger reagents to achieve acceptable chloride levels. Higher temperatures and extended mixing times may enhance chloride dissolution, but they impose greater energy loads and strain equipment designed for more moderate operating conditions.

Accordingly, there is an unresolved need for more streamlined wash strategies that promote targeted solubilization of bound chlorides, minimize water and reagent consumption, limit energy requirements, and yield filter cake compositions with reduced moisture and chloride content. Such approaches would enable enhanced downstream metal recovery, improved product purity, and reduced environmental and economic burdens.

SUMMARY OF THE INVENTION

Accordingly, an objective of the described process and circuit is to produce an enhanced manganese-zinc filter cake composition with increased manganese and zinc concentrations and reduced chloride content through a sequence of washing, dewatering, and drying steps followed by repulping, washing, and dewatering steps.

The problem addressed by the present disclosure lies in the inefficiencies and limitations of conventional processes for reducing chloride concentrations in polymetallic filter cakes derived from saline feedstocks. These filter cakes, which contain metals such as manganese and zinc, often retain significant levels of soluble chloride salts and bound oxychloride complexes.

The disclosed process and circuit address these limitations by introducing an intermediate drying step that alters the physical and chemical properties of the polymetallic filter cake. Specifically, after an initial washing and dewatering stage to remove soluble chlorides, the filter cake is dried to reduce moisture content and weaken the bonds within oxychloride complexes. This drying step increases the water solubility of the bound chlorides, enabling their more effective removal in subsequent washing stages. By incorporating this intermediate drying step, the process achieves notable chloride reduction without requiring excessive reagent use, such as soda ash, and reduces water and energy consumption. This approach not only enhances the purity of the resulting manganese-zinc filter cake composition but also improves the efficiency and sustainability of the process.

Broadly, the solution involves a multi-stage circuit that integrates washing, dewatering, drying, and repulping steps in an optimized sequential process. The drying stage, which operates at controlled temperatures and residence times, represents an advancement that disrupts the association of chloride ions within the filter cake matrix. The drying stage is followed by a repulping and washing stage, where the solubilized chlorides are effectively removed. The process parameters, such as drying temperature, residence time, and repulping liquor composition, are tailored to enhance chloride removal while preserving the integrity of the metal content. The inventive process and circuit not only address the inefficiencies of prior approaches but also enable the production of improved manganese-zinc filter cake compositions with reduced chloride concentrations, facilitating enhanced downstream metal recovery and product quality.

In general, the invention relates to a process for producing an enhanced manganese-zinc filter cake composition. The process includes washing and dewatering a mixed polymetallic filter cake composition derived from a saline feedstock with a wash liquor to produce a dewatered polymetallic filter cake composition. The mixed polymetallic filter cake composition has oxides, hydroxides, chloride salts, or a combination thereof, and more particularly an initial concentration of manganese and zinc and an initial concentration of oxychloride salts. The process then dries the dewatered polymetallic filter cake composition in a drying device to reduce a moisture content and to increase a water solubility of the oxychloride salts in the dewatered polymetallic filter cake composition to produce a dried polymetallic filter cake composition. The dried polymetallic filter cake composition is repulped and washed with a repulping liquor to produce an enhanced manganese-zinc filter cake composition having an enhanced concentration of manganese and zinc and a reduced concentration of chloride salts.

In an embodiment, the saline feedstock is a geothermal brine, continental brine, oil field or produced water, salt lake brine, mining process water, tailings pond water, salar or evaporite basin brine, desalination brine concentrate, industrial saline wastewater, or a combination or blend thereof.

In an embodiment, the drying device is one or more batch and/or continuous convection ovens, rotary drum dryers, vacuum dryers, infrared dryers, belt dryers, flash dryers, fluidized bed dryers using steam heat, electric heat, gas-fired heat, recycled heat or hot air stream, or other industrial drying device(s).

In an embodiment, the process includes a step of selecting at least one process parameter of cake thickness, repulp and/or wash liquor flow rate, repulp and/or wash liquor temperature, residence time, mixing intensity, repulp and/or wash stage configuration, or a combination thereof to enhance the reduced concentration of chloride salts.

In an embodiment, the drying step is performed at a predetermined temperature sufficient to air-dry or oven-dry the dewatered polymetallic filter cake composition until the dried polymetallic filter cake composition reaches a predetermined moisture content, where most, if not all, of the free moisture has been removed.

In an embodiment, the drying step is performed at a temperature between about 60° C. and about 120° C. (or any value or range therebetween), and/or wherein the dewatered polymetallic filter cake composition is held in the drying device for a residence time of between about 2 hours and about 24 hours (or any value or range therebetween).

In an embodiment, the drying device operates at a temperature between about 90° C. and about 110° C. (or any value or range therebetween), and/or wherein the dewatered polymetallic filter cake composition is held in the drying device for a residence time of between about 4 hours and about 12 hours (or any value or range therebetween).

In an embodiment, washing the dried polymetallic filter cake composition includes repulping the dried polymetallic filter cake composition with a first repulping liquor to form a slurried polymetallic filter cake composition and washing the slurried polymetallic filter cake composition with a second repulping liquor to produce an enhanced manganese-zinc filter cake composition.

In an embodiment, the repulping step is performed at a temperature between about 30° C. and about 95° C. and/or for a residence time of about 20 minutes to about 8 hours (or any value or range therebetween).

In an embodiment, the repulping step is performed at a temperature between about 55° C. and about 95° C. and/or for a residence time of about 40 minutes to about 4 hours (or any value or range therebetween).

In an embodiment, the process also includes the step of dewatering the enhanced manganese-zinc filter cake composition in a dewatering device to produce a dewatered enhanced manganese-zinc filter cake composition having the enhanced concentration of manganese and zinc and the reduced concentration of chloride salts.

In an embodiment, the process also includes the step of drying the enhanced manganese-zinc filter cake composition, the dewatered enhanced manganese-zinc filter cake composition, or both in a drying device to produce a dried enhanced manganese-zinc filter cake composition having the enhanced concentration of manganese and zinc and the reduced concentration of chloride salts.

In general, in another aspect, the invention relates to an enhanced manganese-zinc filter cake composition having between about 36 weight percent and about 45 weight percent manganese, between about 15 weight percent and about 17 weight percent zinc, and less than about 3 weight percent chloride.

In an embodiment, the chloride concentration of the enhanced manganese-zinc filter cake composition is between about 1 weight percent and about 2 weight percent.

In an embodiment, the chloride concentration of the enhanced manganese-zinc filter cake composition is between about 1.5 weight percent and about 1.7 weight percent.

In an embodiment, the chloride concentration of the enhanced manganese-zinc filter cake composition is less than about 1.5 weight percent.

In an embodiment, the chloride concentration of the enhanced manganese-zinc filter cake composition is between about 0.05 weight percent and about 0.25 weight percent.

In an embodiment, the enhanced manganese-zinc filter cake composition of claim 11, further comprising up to about 1 weight percent aluminum and/or up to about 1 weight percent iron.

In general, in yet another aspect, the invention relates to a circuit for producing an enhanced manganese-zinc filter cake composition. The circuit has a first-stage washing and dewatering process circuit configured to receive a mixed polymetallic filter cake composition derived from a saline feedstock and to produce a dewatered polymetallic filter cake composition. The first-stage washing and dewatering process circuit has a first washing stage configured to wash the mixed polymetallic filter cake composition with a wash liquor and a first dewatering stage having a filtration or dewatering device configured to produce the dewatered polymetallic filter cake composition. The circuit has an intermediate-stage drying process circuit downstream of the first-stage washing and dewatering process circuit, which is configured to increase a water solubility of oxychloride salts in the dewatered polymetallic filter cake composition and to produce a dried polymetallic filter cake composition. The intermediate-stage drying process circuit has a drying device. A second-stage washing process circuit is downstream of the intermediate-stage drying process circuit and configured to repulp and wash the dried polymetallic filter cake composition with a repulping liquor to produce an enhanced manganese-zinc filter cake composition having an enhanced concentration of manganese and zinc and a reduced concentration of chloride salts.

In an embodiment, the filtration or dewatering device in the first dewatering stage includes one or more batch or continuous vacuum- or pressure-filters.

In an embodiment, the drying device in the intermediate-stage drying process circuit includes one or more batch and/or continuous convection ovens, rotary drum dryers, vacuum dryers, infrared dryers, belt dryers, flash dryers, fluidized bed dryers using steam heat, electric heat, gas-fired heat, recycled heat or hot air stream, or other industrial drying device(s).

In an embodiment, the first-stage washing and dewatering process circuit and the second-stage washing process circuit each include a displacement wash process circuit, a repulp wash process circuit, a countercurrent decantation process circuit, or a combination thereof.

In an embodiment, the second-stage washing process circuit is configured to repulp and wash the dried polymetallic filter cake composition with the repulping liquor comprising water, an alkali selected from the group consisting of sodium carbonate, potassium carbonate, calcium carbonate, sodium hydroxide, potassium hydroxide, calcium hydroxide, lithium hydroxide, and ammonium hydroxide, or a combination or mixture thereof.

In an embodiment, a final-stage dewatering and drying process circuit is downstream of the second-stage washing process circuit.

In an embodiment, the final-stage dewatering and drying process circuit includes a final dewatering stage having a filtration or dewatering device configured to produce a dewatered, enhanced manganese-zinc filter cake composition with an enhanced concentration of manganese and zinc and a reduced concentration of chloride salts.

In an embodiment, a final drying stage is downstream of the final dewatering stage and includes a drying device configured to produce a dried enhanced manganese-zinc filter cake composition having the enhanced concentration of manganese and zinc and the reduced concentration of chloride salts.

In an embodiment, the filtration or dewatering device in the final dewatering stage is one or more batch or continuous vacuum- or pressure-filters, and wherein the drying device in the final drying stage comprises one or more batch and/or continuous convection ovens, rotary drum dryers, vacuum dryers, infrared dryers, belt dryers, flash dryers, fluidized bed dryers using steam heat, electric heat, gas-fired heat, recycled heat or hot air stream, or other industrial drying device(s).

BRIEF DESCRIPTION OF THE DRAWINGS

The above and other objects and advantages of this invention may be more clearly seen when viewed in conjunction with the accompanying drawing, wherein.

DETAILED DESCRIPTION OF THE INVENTION

Figure 1:
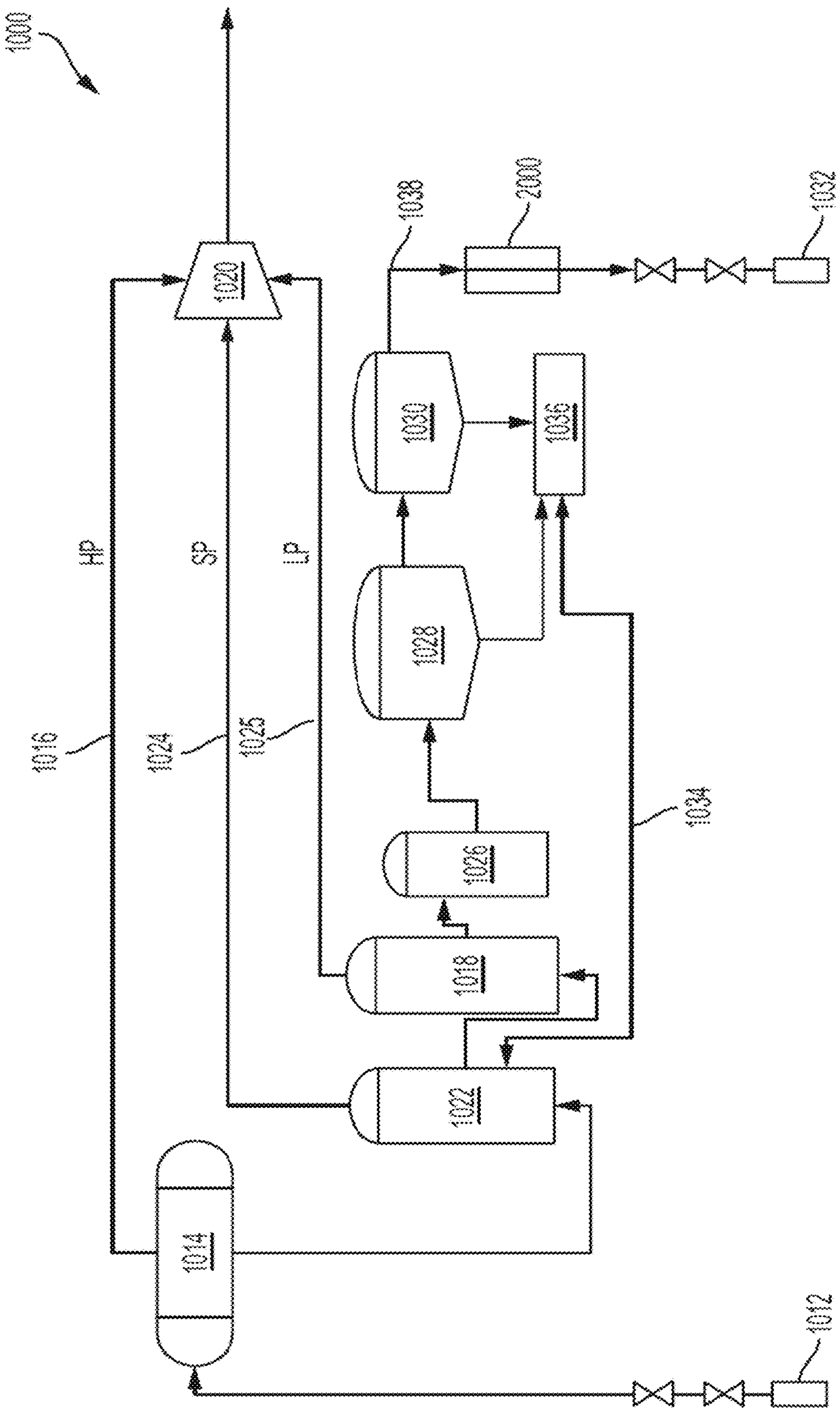
FIG. 1 PRIOR ART
FIG. 1 is a process flow diagram of an example of a crystallizer reactor clarifier process for power plant operations.

The following detailed description provides illustrative embodiments of the described subject matter and is intended to enable those skilled in the art to make and use the described processes. The subject matter generally relates to processes and circuits for producing enhanced manganese-zinc filter cake compositions that reduce chloride and other impurity concentrations, namely oxychloride concentrations, while increasing the concentrations of recoverable metals, namely manganese and zinc. The described processes and circuits are particularly applicable to filter cake compositions derived from geothermal brines and other saline resources.

The embodiments described herein are provided for illustrative purposes only and are not intended to limit the scope of the described subject matter. Certain details, such as well-known processing techniques or equipment configurations, may be omitted for clarity and brevity, as they are readily understood by those skilled in the art. Furthermore, various modifications, substitutions, or rearrangements of the described processes, circuits, and compositions may be made without departing from the scope of the described subject matter, as defined by the appended claims.

The invention relates generally to processes and circuits for producing enhanced manganese-zinc filter cake compositions. After beneficiating zinc and manganese from a brine feedstock into a polymetallic oxide/hydroxide/oxychloride underflow slurry, the polymetallic slurry is initially washed and dewatered to remove soluble chlorides before being dried to remove interstitial water and weaken the chloride bonds within the oxide, hydroxide, and/or oxychloride complexes, thereby converting the oxychloride complexes from a water-insoluble state to a water-soluble state in the dried polymetallic filter cake composition.

The process then repulps and washes the dried polymetallic filter cake composition to remove solubilized oxychloride complexes to produce an enhanced manganese-zinc filter cake composition with increased concentrations of zinc and manganese and reduced concentrations of chloride. The resulting compositions are enhanced because the initial concentration of chloride and other impurities, such as aluminum and iron, has been reduced, thereby beneficiating the enhanced manganese-zinc filter cake compositions, so that high-purity and higher-value-added manganese and zinc products, such as zinc sulfate, zinc oxide, zinc metal, manganese sulfate monohydrate, ferromanganese (or other steel-grade Mn products), and electrolytic manganese metal (EMM), can be later processed. The enhanced filter cake compositions may be presented in slurried, dewatered, or dried forms, depending on the processing stage, and exhibit improved physical and chemical properties for industrial applications.

Concentrations in the enhanced manganese-zinc filter cake compositions can be increased by about 30% to about 40% for zinc and by about 25% to about 35% for manganese using the inventive process and circuit. The enhanced manganese-zinc filter cake compositions can have a concentration between about 30 wt. % and about 45 wt. % manganese (or more than about 300,000 ppm manganese) (and any range or value therebetween), between about 11 wt. % and about 20 wt. % zinc (or between about 15% and about 17% zinc) (or more than about 110,000 ppm zinc) (and any range or value therebetween), and less than about 15 wt. % chloride (or less than about 150,000 ppm chloride) or preferably less than about 3 wt. % or 30,000 ppm chloride (or between about 2 wt. % or 20,000 ppm chloride and about 1 wt. % or 10,000 ppm chloride) (and any range or value therebetween, specifically including without limitation about 1.5 wt. % to about 1.7 wt. % or about 15,000 ppm to about 17,000 ppm chloride) (or less than about 1.5 weight percent or 15,000 ppm chloride) (any range or value therebetween, specifically including without limitation between about 0.05 weight percent and about 0.25 weight percent or about 500 ppm to about 2,500 ppm chloride), the remaining being balanced by concentrations of alkali, alkaline-earth, transition, and/or other metals. In addition, the enhanced manganese-zinc filter cake compositions can have up to about 1 wt. % aluminum (or less than about 10,000 ppm aluminum) (and any value or range therebetween) and up to about 1 wt. % iron (or less than about 10,000 ppm iron) (and any value or range therebetween).

A slurried, enhanced manganese-zinc filter cake composition can have a moisture content of between about 30% and about 95% by weight moisture (or between about 35% and about 75% or between about 40% and about 70% by weight moisture) (and any range or value therebetween). A dewatered enhanced manganese-zinc filter cake composition can have a moisture content between about 10% and about 60% by weight moisture (or between about 20% and about 45% by weight moisture) (and any range or value therebetween). The enhanced manganese-zinc filter cake composition can be agglomerated, granulated, and/or pelletized to a particle size between about 10 centimeters and about 100 micrometers. The enhanced manganese-zinc filter cake composition can be dried to a moisture content of less than about 20% (or preferably less than about 10% or between about 7% and about 10%) by weight (and any range or value therebetween). Additionally, the enhanced manganese-zinc filter cake composition can have a specific gravity of about 3.3 to about 3.6 (and any value or range therebetween). The enhanced manganese-zinc filter cake compositions (in the slurried, dewatered, or dried forms) can then be processed to extract manganese and zinc therefrom.

The processes and circuits described herein are applicable to a wide range of saline and metalliferous feedstocks. In addition to geothermal brines, suitable feedstocks include continental brines, salar brines, oil field or produced water brines, salt lake brines, mining process waters and tailings pond waters, salar or evaporite basin brines, desalination brine concentrates, industrial saline wastewaters, or a combination or blend thereof. These feedstocks typically exhibit total dissolved solids (TDS) concentrations ranging from about 10,000 ppm to over 300,000 ppm, and the feedstocks may contain manganese and zinc at concentrations from a few parts per million to several thousand parts per million, depending on the source. The impurity profile of these feedstocks often includes high concentrations of chloride, sodium, calcium, magnesium, potassium, sulfate, and a range of dissolved metals, which can complicate downstream processing and product purification.

By way of example, for geothermal brine feedstocks, such as a flow from production geothermal wells in Imperial County, California, such as the Salton Sea, East Brawley, South Brawley, North Brawley, Heber, East Mesa, Glamis, or Dunes Known Geothermal Resource Areas, the brine is flashed into steam to power a turbine generator to produce electricity. As part of the power plant operations and processes (the "power plant operations"), scaling constituents (mainly iron silicates and amorphous silica) are selectively removed to minimize scale formation from the brine on the plant equipment, vessel internals, and associated piping before injection of spent brine back into the geothermal formation. In hypersaline geothermal brines, such as those from Imperial County, California, the concentration of salt can exceed the solubility when the geothermal brine is flashed to atmospheric pressure and dilution water is added to keep the injected brine slightly below saturation with respect to salt. From this point in the power plant operations, the brine is routed to a series of reactor clarifiers to selectively reduce the concentration of silica in the injected brine to levels near saturation. The clarifiers precipitate silica and iron, along with arsenic, barium, and lead, resulting in a polished geothermal brine suitable for reinjection via the power plant injection wells.

As generally illustrated in FIG. 1, existing power plant operations 1000 involve a liquid brine flow from geothermal production wells 1012 that is partially flashed into steam due to pressure losses as the liquid brine flows up the production well casing. The two-phase mixture of brine and steam is routed to a high-pressure separator 1014, where the liquid brine and high-pressure steam are separated. High-pressure steam 1016 is routed from the separator 1014 to a centrifugal-type steam scrubber (not shown) that removes brine carryover from the steam, and from there, the scrubbed high-pressure steam 1016 is routed to the turbine generator 1020.

The liquid brine from the high-pressure separator 1014 is flashed into a standard-pressure crystallizer 1022, the standard-pressure steam 1024 from the standard-pressure crystallizer 1022 is passed through a steam scrubber (not shown), and the scrubbed standard-pressure steam 1024 is routed to the turbine 1020. Precipitated solids from clarifiers 1028 and 1030 are mixed with the brine in the standard-pressure crystallizer 1022, make contact with scaling materials therein, and reduce the scaling tendency in the brine significantly.

A brine slurry mixture from the standard-pressure crystallizer 1022 is flashed into a low-pressure crystallizer 1018. Low-pressure steam 1025 from the low-pressure crystallizer 1018 flows through a steam scrubber (not shown) and then either to a low-pressure turbine or to the low-pressure side of a dual-entry turbine 1020. The brine slurry mixture is flashed to atmospheric pressure in an atmospheric flash tank 1026 and then flows into a primary clarifier 1028.

The primary clarifier 1028 can be an internally recirculating reactor-type clarifier that precipitates various scaling constituents, e.g., silica and iron, down to close to equilibrium values at the operating temperature of the brine, e.g., approximately 229° F. The precipitated solids are flocculated and settled to the bottom of the primary clarifier tank 1028, and the underflow slurry flows out of the bottom of the primary clarifier 1028 to an accumulated solids tank 1036. A relatively clear brine overflow flows from the primary clarifier 1028 to a secondary clarifier 1030 that removes additional suspended solids, e.g., silica, iron, manganese, and zinc, from the brine. The clarified brine overflow flows out of the secondary clarifier 1030, and the underflow slurry flows out of the bottom of the secondary clarifier 1030.

Flocculent and scale inhibitors can be added between the primary clarifier 1028 and the secondary clarifier 1030 to enhance solids settling and prevent the precipitation of radioactive alkaline earth salts. The stable overflow from the secondary clarifier 1030 can be pumped to a mineral and/or lithium extraction plant 2000 or can be pumped into injection wells 1032. A portion of the precipitated solids from the underflow of the primary clarifier 1028 and the underflow of the secondary clarifier 1030 can be recycled from the accumulated solids tank 1036 upstream to the standard-pressure crystallizer 1022 as seed material 1034. The remainder of the accumulated solids in the underflow from both the primary clarifier 1028 and the secondary clarifier 1030, which are rich in chloride salts and other precipitated impurities, are dried and transported to a landfill for disposal.

Figure 2A:
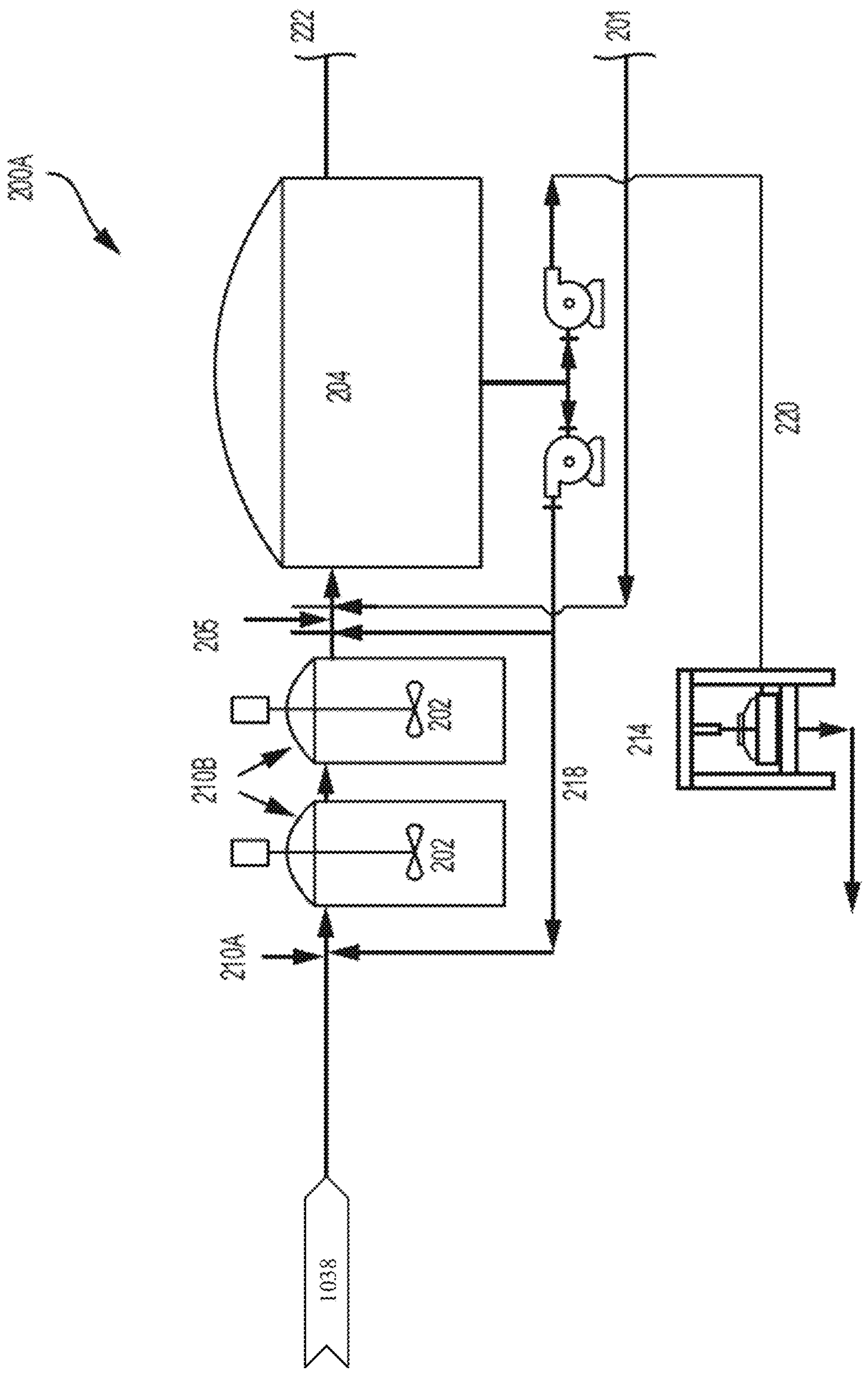
FIG. 2A is a process flow diagram of an example of a circuit for producing a polymetallic silica-iron filter cake composition.
Figure 2B:
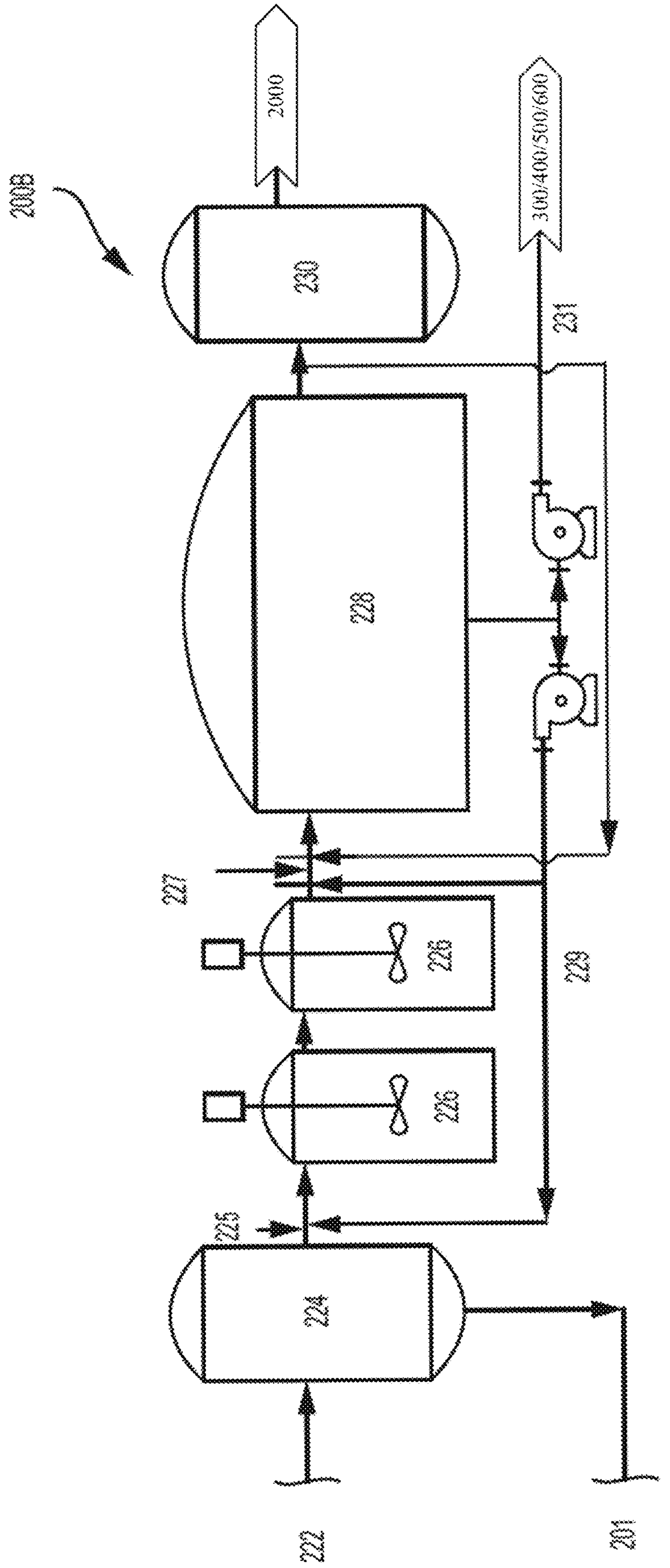
FIG. 2B is a process flow diagram of an example of a process for producing a polymetallic oxide/hydroxide/oxychloride filter cake composition.

As illustrated in FIGS. 2A and 2B, one or a blend of brines 1038, such as a geothermal brine or the brine that exits the overflow of the secondary clarifier 1030 from the power plant operations 1000 having reduced amounts of scaling constituents or another saline feedstock discussed above, passes to an impurity removal circuit for the removal of silica, iron, manganese, and zinc from the brine to prevent scaling and fouling of the downstream mineral and/or lithium extraction plant 2000. The impurity removal circuit can include a first or iron/silica precipitation stage 200A with a first set of reaction and settling tanks 202 and 204 to remove iron and silica (FIG. 2A), followed by a second or zinc/manganese precipitation stage 200B with a second set of reaction and settling tanks 226 and 228 to remove metal hydroxides, namely manganese and zinc (FIG. 2B). The first or iron/silica precipitation stage 200A of the impurity removal circuit includes adding a basic reagent 210A (e.g., calcium carbonate ($CaCO_3$), sodium carbonate ($NaCO_3$), or lithium hydroxide (LiOH)) and injecting an oxidizer 210B (e.g., oxygen in air or hydrogen peroxide) into the feed brine 1038. The oxidizer 210B causes the iron to oxidize, and the limestone 201 slightly elevates the brine's pH to counteract the iron's oxidation, which would otherwise reduce the pH of the brine.

A tertiary clarifier 204 is positioned downstream of the first reaction tank(s) 202 to settle out the silica and iron in the brine. A flocculant 205 can be added for additional solids-liquid separation in the tertiary clarifier 204. The underflow of precipitated solids is settled to the bottom of the tertiary clarifier 204. A relatively clear brine overflow 222 passes from the tertiary clarifier 204 to the second or zinc/manganese precipitation stage 200B of the impurity removal circuit. A portion of the precipitated solids 218 from the underflow of the tertiary clarifier 204 is recycled upstream to the reaction tanks 202 as seed material. The remaining accumulated solids 220 in the underflow of the tertiary clarifier 204 are routed to a pressure or vacuum filter 214 for dewatering. Then the iron-silica filter cake 216 can be dried and transported to a landfill for disposal or made available for end uses, such as a cement or concrete additive.

The zinc/manganese precipitation stage 200B of the impurity removal circuit includes an optional polishing filter 224 before adding slaked lime 225 (calcium oxide (CaO)) to the brine in the second reaction tank 226, which causes the brine pH to elevate to between about 7.8 and about 8.5. A quaternary clarifier 228 is positioned downstream of the second reaction tank 226, which allows the metals as oxides and/or hydroxides (primarily zinc and manganese) to precipitate and settle to the bottom of the clarifier 228. A flocculant 227 can be added for additional solids-liquid separation in the quaternary clarifier 228. A clear brine overflow from the quaternary clarifier 228 is further polished in a polishing filter 230 before being pumped to the downstream mineral and/or lithium extraction plant 2000.

A portion of the precipitated solids 229 from the underflow of the quaternary clarifier 228 is recycled upstream to the reactors 226 as additional seed material, and the remaining precipitated solids 231 in the underflow of the quaternary clarifier 228 are routed to the inventive process and circuit. The slurry underflow 231 from the quaternary clarifier 228 has high concentrations of manganese and zinc with a moisture range of about 40% to about 70%, or more particularly about 42% to about 66% (and any range or value therebetween) with an average of about 53% moisture.

Some of the precipitated chlorides in the slurry underflow 231 are tightly bound, and unless removed, could interfere with a downstream mineral recovery process and circuit 3000 for separating manganese and zinc; for example, chlorine and hydrochloric acid derived from chloride are destructive to kilns used in pyrometallurgical processes for zinc and manganese separation. Further, retained chloride in final products can render those outside of standard market specification ranges, thereby limiting marketable opportunities. For most downstream processing, chlorides should be removed to reasonable levels of less than about 3% by weight or 30,000 ppm chloride (or between about 2 wt. % or 20,000 ppm chloride and about 1 wt. % or 10,000 ppm chloride) (and any range or value therebetween, specifically including without limitation about 1.5 wt. % to about 1.7 wt. % or about 15,000 ppm to about 17,000 ppm chloride) (or less than about 1.5 weight percent or 15,000 ppm chloride) (any range or value therebetween, specifically including without limitation between about 0.05 weight percent and about 0.25 weight percent or about 500 ppm to about 2,500 ppm chloride).

To recover the valuable minerals as separate products, the slurry underflow 231 is sent to the inventive wash process and circuit to produce enhanced manganese-zinc filter cake compositions having an increased concentration of metal oxides and hydroxides and a decreased concentration of soluble chloride salts. The enhanced filter cake composition, in a slurried, dewatered, or dried state, can then be further processed to separate zinc and manganese. By isolating zinc and manganese into separate process streams, the downstream mineral recovery process(es) can produce valuable high-purity products, including, but not limited to, zinc sulfate, zinc oxide, zinc metal, manganese sulfate monohydrate, ferromanganese (or other steel-grade Mn products), and electrolytic manganese metal (EMM).

Figure 3:
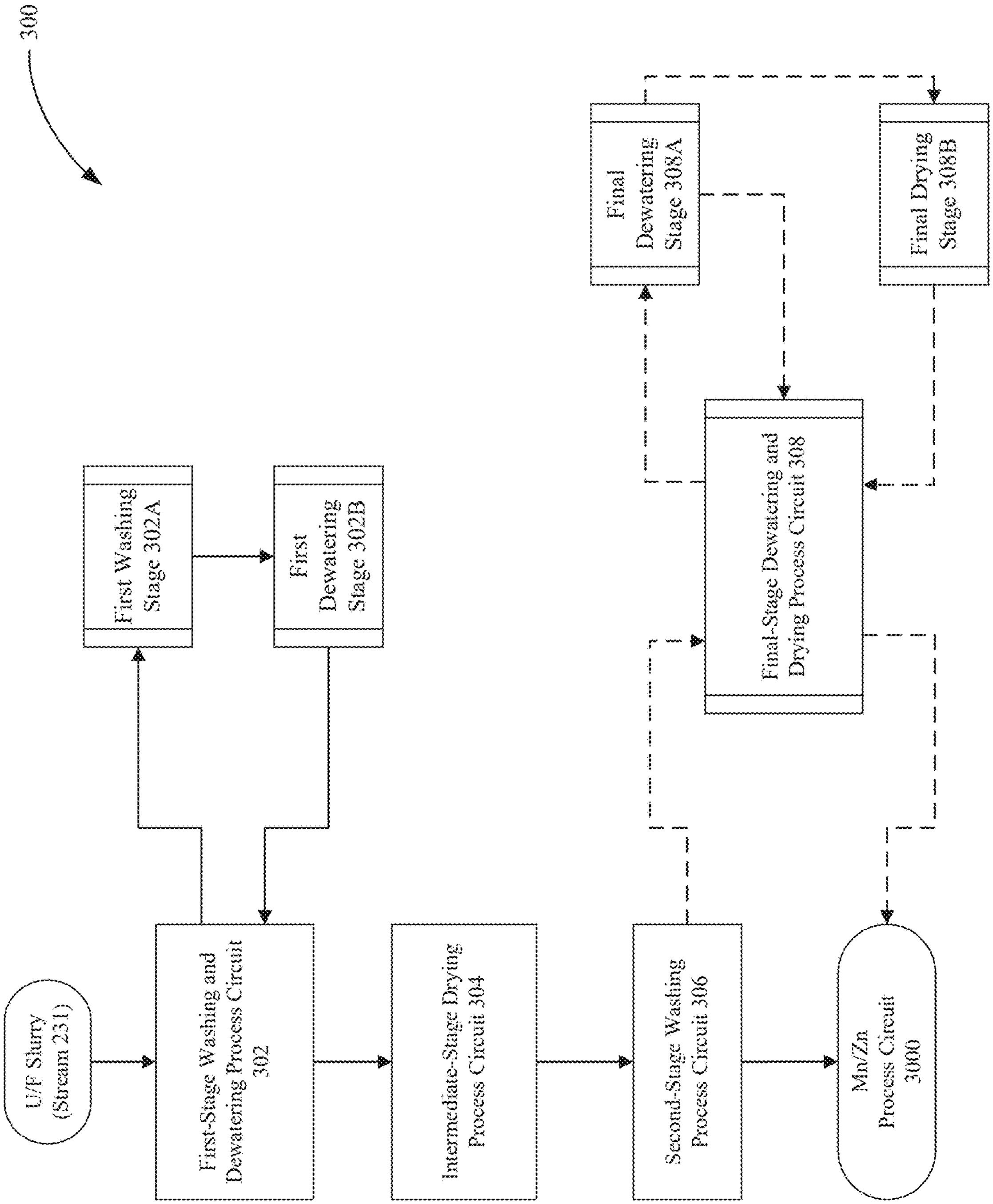
FIG. 3 is a flow chart of an example of a wash process and circuit for producing an enhanced manganese-zinc filter cake composition in accordance with an illustrative embodiment of the invention disclosed herein.

As illustrated in FIG. 3, the inventive process and circuit are exemplified by a wash process and circuit 300, which includes a first-stage washing and dewatering process circuit 302. The first-stage washing and dewatering process circuit 302 is configured to wash and separate soluble precipitated chloride salts, such as soluble sodium, potassium, and calcium chlorides, and residual brine 1038 from the slurry underflow 231 to form a dewatered polymetallic oxide/hydroxide/oxychloride filter cake composition. By initially separating these soluble chloride salts from the metal oxides, hydroxides, and/or oxychlorides in the dewatered polymetallic filter cake composition, the percentage by weight of recoverable metal oxides and hydroxides, e.g., manganese and zinc, is increased in the enhanced manganese-zinc filter cake composition.

The exemplified process and circuit 300 includes subprocess circuits for a first washing stage 302A and a first dewatering stage 302B. The washing stage 302A can be configured for one or more countercurrent decantation washes and/or one or more displacement washes with a wash liquor. The wash liquor includes water from any suitable supply sufficiently low in concentration of the constituents that are being washed out (e.g., chlorides). By way of example, the water for the wash liquor can be sourced or recycled from other plant operations (e.g., cooling tower blowdown, dilution, tap, deionized, makeup, canal, recycled, or a combination of mixture thereof), such as the power plant 1000 and/or the mineral extraction circuit 2000, thereby improving the overall water management of the process and circuit 300.

The first dewatering stage 302B includes a batch or continuous filtration or dewatering device, such as one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable filtration or dewatering device(s). The dewatered polymetallic oxide/hydroxide/oxychloride filter cake composition contains a substantial amount of residual moisture, often in the range of about 10% to about 60% by weight moisture (or between about 20% and about 45% by weight moisture) (and any range or value therebetween). The dewatered polymetallic filter cake composition also retains a significant fraction of soluble chloride salts, bound insoluble oxychlorides, and other brine-derived impurities. The thickness of the dewatered polymetallic filter cake composition from the first dewatering stage 302B may be adjusted to influence subsequent drying in a downstream intermediate-stage drying process circuit 304.

After the first dewatering stage 302B, the dewatered polymetallic filter cake composition is routed to the intermediate-stage drying process circuit 304 downstream of the first-stage washing and dewatering process circuit 302. The intermediate-stage drying process circuit 304 is configured to reduce the moisture content of the dewatered polymetallic filter cake composition and to fundamentally alter the physical and chemical state of the residual chloride salts by disrupting the association of chloride ions within the filter cake matrix to solubilize residual, bound insoluble oxychlorides. More particularly, the intermediate-stage drying process circuit 304 forms a dried polymetallic oxide/hydroxide/oxychloride filter cake composition by removing interstitial and loosely bound water from the dewatered polymetallic filter cake composition, which not only improves the physical stability and handling characteristics of the composition but also optimizes water usage in downstream washing process circuit(s). The intermediate-stage drying process circuit 304 also weakens the chemical bonds between oxychloride and the filter cake matrix in the dried polymetallic filter cake composition, making the residual chlorides more water soluble and more readily removed during the downstream washing process circuit(s).

The intermediate-stage drying process circuit 304 includes a batch and/or continuous drying device, such as one or more convection ovens, rotary drum dryers, vacuum dryers, infrared dryers, belt dryers, flash dryers, fluidized bed dryers using steam heat, electric heat, gas-fired heat, recycled heat or hot air stream, or other suitable industrial drying device(s), which can be combined with a dryer baghouse. The intermediate-stage drying process circuit 304 can be configured to utilize recycled or waste heat or low-grade energy from other plant operations, thereby improving the overall energy profile of the inventive process and circuit 300. The drying parameters, namely the temperature and/or residence time, are selected to sufficiently air-dry or oven-dry the dewatered polymetallic filter cake composition until the dried polymetallic filter cake composition reaches a predetermined moisture content, where most, if not all, of the free moisture has been removed. For example, the moisture content of the dried polymetallic filter cake composition can be reduced to a target level, generally less than about 20% by weight (or preferably less than about 10% by weight, or less than about 5% by weight) (and any range or value therebetween), depending on downstream process requirements and material handling considerations. Depending upon the particular type of drying device(s), the drying temperatures of the air flow from a steam powered drying device(s) may range from about 60° C. to about 120° C. (or any value or range therebetween), with residence times from about 2 hours to about 24 hours (and any range or value therebetween), or the air flow from an electric or gas-fired drying device(s) may be in excess of 120° C. with a shorter residence time, sufficient to achieve the desired moisture and chloride reduction.

The second-stage washing process circuit 306 repulps and washes the dried polymetallic filter cake composition from the intermediate-stage drying process circuit 304 to produce a slurried enhanced manganese-zinc filter cake composition having between about 30% and about 95% by weight moisture (or between about 35% and about 75% or between about 40% and about 70% by weight moisture) (and any range or value therebetween). The second-stage washing process circuit 306 can be configured to repulp the dried polymetallic filter cake composition in a repulping device, such as one or more tanks with an impeller, hydrapulpers, drum pulpers, or other suitable repulping device(s), before one or more displacement washes or countercurrent decantation washes with a repulping liquor.

The repulping liquor is a water solution, which if desired can also include an aqueous alkali or basic reagent, such as sodium carbonate ($Na_2CO_3$), potassium carbonate ($K_2CO_3$), calcium carbonate ($CaCO_3$), sodium hydroxide (NaOH), potassium hydroxide (KOH), calcium hydroxide ($Ca(OH)_2$), lithium hydroxide (LiOH), ammonium hydroxide ($NH_4OH$), or a mixture or solution thereof. The alkali reagent (e.g., soda ash), if present, can be up to about 100 grams (preferably less than about 50 grams or less than about 10 grams) (and any value or range therebetween) of alkali per liter of water. Similar to the wash liquor, the water for the repulping liquor can be from any suitable supply sufficiently low in concentration of the constituents that are being washed out (e.g., cooling tower blowdown, dilution, tap, deionized, makeup, canal, recycled, or a combination of mixture thereof), such as recycled from other plant operations, e.g., the power plant 1000 and/or the mineral extraction circuit 2000.

The temperature and residence time in the repulp stage of the second-stage washing process circuit 306 are other parameters that can be optimized to synergize with the intermediate-stage drying process circuit 304. Efficient repulping in the second-stage washing process circuit 306 at temperatures between about 30° C. and about 95° C. (or between about 55° C. and about 95° C.) (or any value or range therebetween) for a residence time of about 20 minutes to about 8 hours (or between about 40 minutes and about 4 hours) (or any value or range therebetween) can significantly reduce chlorides. By increasing the duration for which the dried polymetallic filter cake composition is mixed with the repulping liquor in the second-stage washing process circuit 306, more thorough dissolution and migration of chloride ions from the solid matrix into the liquid phase can be achieved. Longer residence times provide additional opportunity for mass transfer processes to approach equilibrium, resulting in more complete extraction of chlorides from the enhanced manganese-zinc filter cake composition. This technical effect is particularly pronounced when combined with elevated temperatures and vigorous mixing in the second-stage washing process circuit 306, further enhancing the solubility and mobility of chloride ions.

When the dried polymetallic filter cake composition from the intermediate-stage drying process circuit 304 is repulped with the repulping liquor in the second-stage washing process circuit 306 (exemplified below in Example 1 with water only, but the process circuit could be enhanced with soda ash or other alkali additives with water in the repulping liquor), the resulting enhanced manganese-zinc filter cake composition exhibits a significantly lower chloride content compared to undried controls, in particularly solubilized oxychloride complexes that interfere with the downstream mineral recovery process and circuit 3000 for producing high-quality zinc and manganese products. As demonstrated by the experimental data below in Table 1 and Example 1, the intermediate-stage drying process circuit 304 has a pronounced effect on subsequent chloride removal in the second-stage washing process circuit 306.

cake composition and/or the dried enhanced manganese-zinc filter cake composition can be stored, shipped, or sent for further processing by the process and circuit 3000 for sequentially recovering manganese and zinc products.

Similar to the first-stage washing and dewatering process circuit 302, the slurried enhanced manganese-zinc filter cake composition from the second-stage washing process circuit 306 can be dewatered in the final dewatering stage 308A using an intermittent or continuous filtration or dewatering device, such as one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable filtration or dewatering device(s), to produce a dewatered enhanced manganese-zinc filter cake composition having between about 10% and about 60% (or between about 20% and about 45%) (or any value or range therebetween) by weight retained moisture.

TABLE 1

| Test No. | Repulp Temperature (° C.) | Repulp Duration (mins) R1 | Repulp Duration (mins) R2 | Soda Ash Conn (g/L) | Total $CO_3^{2-}$ Conc (g/L) | Mass of Soda Ash (g) | As-received T2 Cake % Cl | As-received T2 Cake % Zn | As-received T2 Cake % Mn | After Initial Water Wash % Cl | After Initial Water Wash % Zn | After Initial Water Wash % Mn |
|---|---|---|---|---|---|---|---|---|---|---|---|---|
| CWT13 * | 75 | 40 | 20 | 10 | 5.66 | 5 | — | — | — | 17.50 | 9.64 | 26.90 |
| CWT15 ** | 75 | 40 | 20 | 5 | 2.83 | 2.5 | — | — | — | 9.32 | 11.50 | 30.90 |

| Test No. | After R1/D1 % Cl | After R1/D1 % Zn | After R1/D1 % Mn | Final Solids After R2/D2 % Cl | Final Solids After R2/D2 % Zn | Final Solids After R2/D2 % Mn | Zn/Cl ratio R1/D1 | Zn/Cl ratio R2/D2 |
|---|---|---|---|---|---|---|---|---|
| CWT13 * | 0.53 | 13.10 | 35.80 | 0.23 | 12.80 | 35.20 | 25 | 56 |
| CWT15 ** | 0.37 | 13.50 | 36.20 | 0.23 | 13.50 | 36.50 | 36 | 59 |

* CWT13 - Slurry aged for 20 days, then filtered, received an initial 1 BV wash, then the filter cake was placed in the oven at 60° C. for 24 hours.
** CWT15 - Slurry aged for 19 days, then filtered, received an initial 1 BV wash, and filter cake laced in oven at 100° C. for 24 hours (May 21 to May 22, 2025); Stage I with tap water and Stage II with 5 g/L soda ash.

These results demonstrate that the intermediate-stage drying process circuit 304 leads to a substantial improvement in chloride removal. For example, a dried polymetallic filter cake composition that was repulped with a repulping liquor containing only water, without the addition of soda ash or other alkali reagents, achieved a residual chloride content of 0.37% and a Zn:Cl ratio of 36:1, surpassing the process target of a 10:1 Zn:Cl ratio, in the enhanced manganese-zinc filter cake composition. Additional experiments demonstrated that increasing the residence time in the repulp stage from 40 minutes to 4 hours resulted in a 55% reduction in final chloride concentration, highlighting the importance of sufficient reaction time for effective washing of the solubilized oxychlorides.

The slurried manganese-zinc filter cake composition from the second-stage washing process circuit 306 can be routed directly to the process and circuit 3000 for sequentially recovering manganese and zinc products, or if required or desired, the wash process and circuit 300 can also include a final-stage dewatering and drying process circuit 308 intermediate of the second-stage washing process circuit 306 and the mineral recovery process and circuit 3000. The final-stage dewatering and drying process circuit 308 can have sub-process circuits for a final dewatering stage 308A with or without a final drying stage 308B to produce the enhanced manganese-zinc filter cake composition in a dewatered or dried state. The dewatered enhanced manganese-zinc filter The dewatered enhanced manganese-zinc filter cake composition can be dried in the final drying stage 308B to produce a dried enhanced manganese-zinc filter cake composition having less than about 20% (or less than about 10% or between about 5% and about 10%) (or any value or range therebetween) by weight retained moisture. Similar to the intermediate-stage drying process circuit 304, the final drying stage 308B can be integrated into a batch and/or continuous drying device, such as one or more convection ovens, rotary drum dryers, vacuum dryers, infrared dryers, belt dryers, flash dryers, fluidized bed dryers using steam heat, electric heat, gas-fired heat, recycled heat or hot air stream, or other suitable industrial drying device(s), which can be combined with a dryer baghouse. The drying conditions can be selected to sufficiently air-dry or oven-dry the dewatered enhanced manganese-zinc filter cake composition until the dried enhanced manganese-zinc filter cake composition reaches a predetermined moisture content, where most, if not all, of the free moisture has been removed. For example, reduce the moisture content of the dried enhanced manganese-zinc filter cake composition to a target level, generally less than about 20% by weight, preferably less than about 10% by weight, or less than about 5% by weight (or any value or range therebetween), depending on downstream process requirements and material handling considerations. If using steam from the geothermal operations, typical drying temperatures of the air flow from the drying device(s) may range from 60° C. to 120° C. (or any value or range therebetween), with residence times of about 2 hours to about 24 hours (or any value or range therebetween). However, if an electric or gas-fired drying device(s) are utilized, it will be appreciated that the drying temperatures can be more than 120° C. with a shorter residence time sufficient to achieve the desired moisture reduction. The final drying stage 308B can be configured to utilize recycled or waste heat or low-grade energy from other plant operations.

Figure 4:
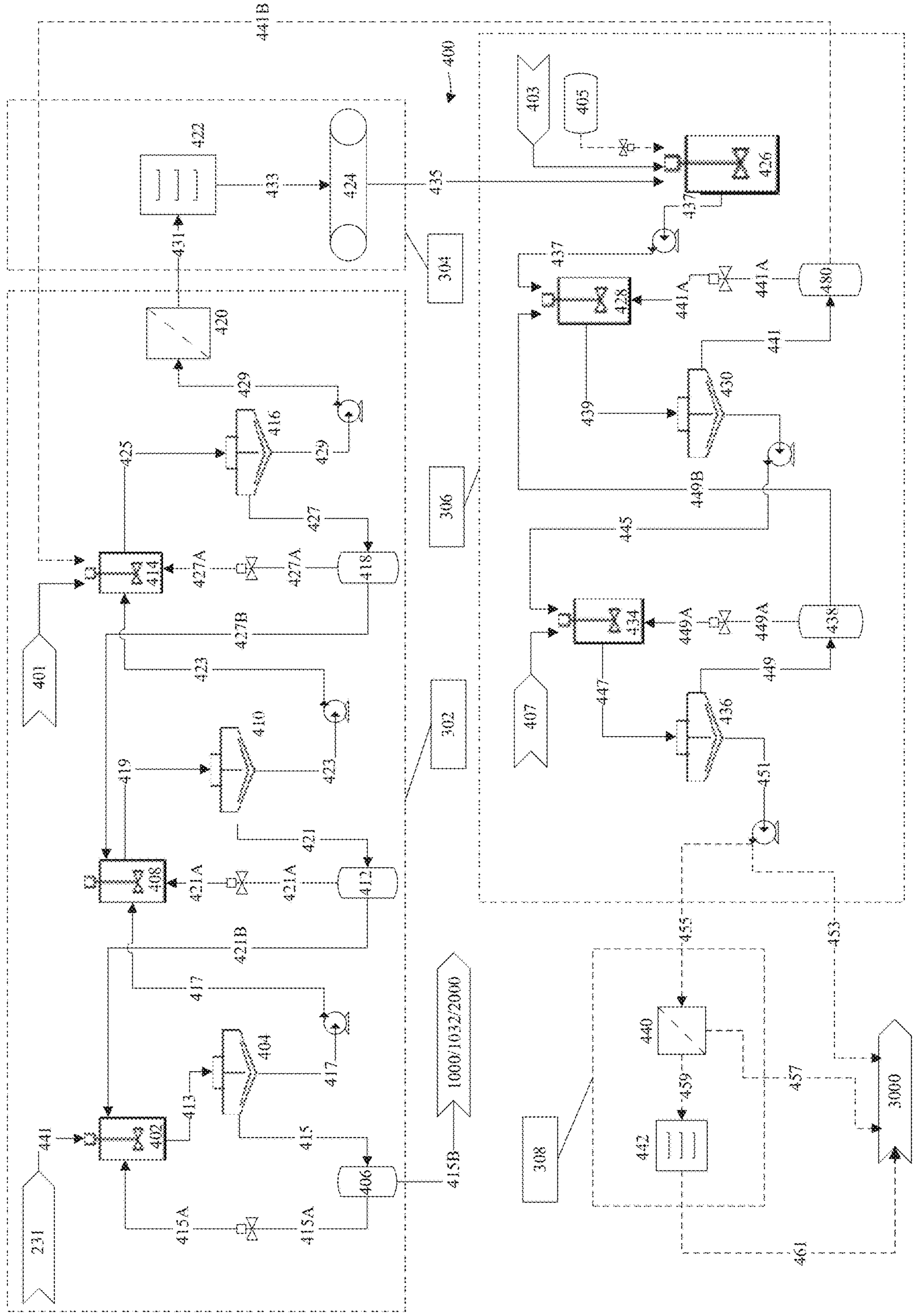
FIG. 4 is a process flow diagram of an example of a countercurrent decantation washing process for producing a slurried, dewatered, and/or dried enhanced manganese-zinc filter cake composition in accordance with an illustrative embodiment of the invention disclosed herein.

Turning now to FIG. 4, the inventive process and circuit is exemplified as a multi-stage countercurrent decantation or CCD wash process and circuit 400. The CCD wash process and circuit 400 have a first-stage washing and dewatering process circuit 302 configured to produce a dewatered polymetallic oxide/hydroxide/oxychloride filter cake composition (stream 431). An intermediate-stage drying process circuit 304 is downstream of the first-stage washing and dewatering process circuit 302 and configured to dry the dewatered polymetallic filter cake composition 431 to form a dried polymetallic oxide/hydroxide/oxychloride filter cake composition (process stream 433). The dried polymetallic filter cake composition 433 is passed to a second-stage washing process circuit 306 downstream of the intermediate-stage drying process circuit 304. The second-stage washing process circuit 306 is configured to efficiently remove solubilized oxychlorides and other remaining soluble chlorides to produce a slurried enhanced manganese-zinc filter cake composition (process stream 451) with enhanced concentrations of polymetallic oxides and hydroxides, namely manganese and zinc. As illustrated, the first-stage washing and dewatering process circuit 302 is configured as a three-stage CCD wash process circuit to wash and separate soluble precipitated chloride salts from the slurry underflow 231, and the second-stage washing process circuit 306 is configured as a two-stage CCD wash process circuit to wash and separate solubilized oxychlorides and residual soluble chloride salts. An optional final-stage dewatering and drying process circuit 308 may be downstream of the second-stage washing process circuit 306 and configured to produce a dewatered (process stream 457) or a dried (process stream 461) enhanced manganese-zinc filter cake composition.

The first-stage washing and dewatering process circuit 302 has a first washing stage 302A that utilizes the countercurrent flow of a wash liquor 401 and the slurried polymetallic oxide/hydroxide/oxychloride filter cake compositions, moving the solids in the underflow (streams 417, 423, and 429) and the wash liquor 401 in the overflow (streams 415, 421, and 427) in opposite directions. Most of the wash liquor 401 is added in the last separation step (thickener 416). As the wash liquor is pumped backward from the last separation stage (thickener 416), it increases in dissolved chlorides as the wash liquor 401 passes through to the first separation step (thickener 404). The wash liquor 401 includes water from any suitable supply sufficiently low in concentration of the constituents that are being washed out (e.g., cooling tower blowdown, dilution, tap, deionized, makeup, canal, recycled, or a combination or mixture thereof). For example, the water for the wash liquor 401 can be recycled from other plant operations, such as the power plant 1000 and/or the mineral extraction circuit 2000.

As illustrated, the first-stage washing and dewatering process circuit 302 includes a plurality of thickener split tanks (406, 412, and 418) that spilt the overflows (streams 415, 421, and 427) from a plurality of thickeners or clarifiers (404, 410, and 416) and recycle a portion back to a plurality of mix tanks (402, 408, and 414) (streams 415A, 421A, and 427A) and the remainder countercurrently to the adjacent mix tank (streams 421B and 427B). A portion of the chloride-laden wash liquor (filtrate) 415B from the overflow from thickener 404 is recycled to the power plant 1000, the mineral extraction circuit 2000, and/or routed for reinjection 1032. Recycling the chloride-laden filtrate 415B also recycles a small quantity (100 ppm or less) of lithium, manganese, and zinc to the upstream or downstream operation streams. The underflow of the slurried manganese-zinc filter cake composition (streams 417, 423, and 429) decreases in dissolved solids, particularly chlorides, and increases in Mn and Zn (and oxides and hydroxides thereof) concentrations as the slurried manganese-zinc filter cake composition flows from the first separation step (thickener 404) to the last separation step (thickener 416).

The underflow slurry 231 is fed (stream 411) to a first thickener mix tank 402, where it is mixed with the overflow (stream 421B) from a second thickener split tank 412 and the recycled wash liquor (stream 415A) from the first thickener split tank 406. The diluted slurry (stream 413) is then processed through the first thickener 404, where the liquid (chloride-laden wash liquor) and the Mn/Zn solids are separated as thickener overflow (stream 415) and underflow (stream 417), respectively. A portion of the thickener overflow (stream 415A) is recycled to the mix tank 402 to provide increased solids and liquid contact and mixing in the thickener 404 and aid in dissolving chlorides and solids settling rates in the thickener 404. The other portion of the thickener overflow (stream 415B) can be recycled to the power plant 1000, the mineral extraction circuit 2000, and/or routed for reinjection 1032. A high molecular weight polyelectrolyte flocculant can be added to one or more of the thickener mix tanks 402, 408, and 414 for additional aid in solids-liquid separation in the thickener 404, 410, and/or 416.

The first thickener 404 underflow (stream 417) is pumped to the second thickener mix tank 408, where it is mixed with overflow (stream 427B) from the third thickener 416. The mixed slurry (stream 419) is then processed through the second thickener 410 to separate the chloride-laden wash liquor and the Mn/Zn solids, respectively, as thickener overflow (stream 421) and underflow (stream 423). A portion of the thickener overflow (stream 421A) is recycled to the second mix tank 408, and the other portion of the thickener overflow (stream 421B) is recycled to the first mix tank 402. The wash process 400 is repeated in the third thickener 416, except fresh wash liquor 401 is introduced and mixed with underflow (stream 423) pumped from the second thickener 410 and the recycled overflow (stream 427A) from the third thickener split tank 418.

The underflow of the slurried polymetallic oxide/hydroxide/oxychloride filter cake composition (stream 429) is pumped from the third thickener 416 to a batch/intermittent or continuous filtration or dewatering device 420, such as one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable filtration or dewatering device(s), in a first dewatering stage 302B to produce a dewatered polymetallic oxide/hydroxide/oxychloride filter cake composition (stream 431) having between about 10% and about 60% (or between about 20% and about 45%) (or any value or range therebetween) by weight retained moisture.

The dewatered polymetallic filter cake composition (stream 431) is routed to the intermediate-stage drying process circuit 304 downstream of the first-stage washing and dewatering process circuit 302. The intermediate-stage drying process circuit 304 includes a drying device 422 to reduce the moisture content of and solubilize the oxychlorides in the dewatered polymetallic filter cake composition (stream 431) to form a dried polymetallic oxide/hydroxide/oxychloride filter cake (process stream 433). The drying device 422 can be integrated into a batch and/or continuous process flow that may be carried out using one or more convection ovens, rotary drum dryers, vacuum dryers, infrared dryers, belt dryers, flash dryers, fluidized bed dryers using steam heat, electric heat, gas-fired heat, recycled heat or hot air stream, or other suitable industrial drying device(s), which can be combined with a dryer baghouse. The drying device 422 can be configured to utilize recycled or waste heat or low-grade energy from other plant operations.

The drying conditions, namely the temperature and/or residence time, are selected to weaken the chemical bonds between oxychloride in the dried filter cake matrix and to reduce the moisture content of the dried polymetallic filter cake composition 433 to a target level where most, if not all, of the free moisture has been removed, depending on downstream process requirements and material handling considerations. Drying temperatures of the air flow from the drying device 422 are selected to air-dry or oven-dry the dried polymetallic filter cake composition 433 to achieve the desired moisture reduction and oxychloride decomposition.

The dried polymetallic filter cake composition 433 is routed (optionally through a material bin (not shown)) to a conveyor or similar solids transport device 424 that feeds (stream 435) the dried polymetallic filter cake composition 433 to a repulp tank 426 in the second-stage washing process circuit 306 to produce a 15% to about 25% by weight slurry (stream 437). The repulp tank 426 can be one or more tanks with an impeller, hydrapulpers, drum pulpers, or other suitable repulping device(s). The repulp tank 426 repulps the dried polymetallic filter cake composition with a repulping liquor 403.

The repulping liquor 403 includes water and can also include an aqueous alkali or basic reagent 405, such as sodium carbonate ($Na_2CO_3$), potassium carbonate ($K_2CO_3$), calcium carbonate ($CaCO_3$), sodium hydroxide (NaOH), potassium hydroxide (KOH), calcium hydroxide ($Ca(OH)_2$), lithium hydroxide (LiOH), ammonium hydroxide ($NH_4OH$), or a mixture or solution thereof. The alkali (e.g., soda ash) 405 can be up to about 100 grams (preferably less than about 50 grams or less than about 10 grams) (and any value or range therebetween) of alkali per liter of water. Similar to the wash liquor 401, the water for the repulping liquor 403 can be from any suitable supply sufficiently low in concentration of the constituents that are being washed out (e.g., cooling tower blowdown, dilution, tap, deionized, makeup, canal, recycled, or a combination of mixture thereof), such as recycled from other plant operations, e.g., the power plant 1000 and/or the mineral extraction circuit 2000.

The process parameters (e.g., flow rate and temperature of the repulping liquor 403, the degree of mixing, and the duration of repulping) of the repulp tank 426 can be controlled to influence the efficiency of chloride removal. For example, using a higher temperature repulping liquor 403 and providing increased agitation may enhance the dissolution and migration of chloride ions from the dried polymetallic filter cake composition 433 matrix into the liquid phase 437. The residence time in the repulp tank 426 may also be selected to allow mass transfer processes to proceed toward completion. Efficient repulping in stages at temperatures between about 30° C. and about 95° C. (or between about 55° C. and about 95° C.) (or any value or range therebetween) for a residence time of about 20 minutes to about 8 hours (or any value or range therebetween) can significantly reduce chlorides.

Similar to the first-stage washing and dewatering process circuit 302, the second-stage washing process circuit 306 includes a plurality of thickener split tanks (432 and 438) that spilt the overflows (streams 441 and 449) from a plurality of thickeners or clarifiers (430 and 436) and recycle a portion back to a plurality of mix tanks (428 and 434) (streams 441A and 449A). A portion of the overflow 441B from the fourth thickener 430 can be recycled to a repulp tank 426, and a portion of the overflow 449B from the fifth thickener 436 can be recycled back to the mix tank 428.

The repulped slurry (stream 437) is pumped from the repulp tank 426 to the fourth mix tank 428, where it is mixed with the overflow (stream 441A) split from the fourth thickener split tank 480 and the recycled overflow (stream 449B) from the fifth thickener 436. The diluted slurry (stream 439) is then processed through the fourth thickener 430, where the liquid (chloride-laden repulping liquor) and the Mn/Zn solids are separated as thickener overflow (stream 441) and underflow (stream 445), respectively. A portion of the thickener overflow (stream 441A) is recycled to the mix tank 428 to provide increased solids and liquid contact and mixing in the fourth thickener 430 and aid in dissolving chlorides and solids settling rates in the fourth thickener 430. The fourth thickener split tank 480 can also include a chloride recycle outlet (stream 441B) returning a portion of the chloride-laden repulp liquor to the third thickener mix tank 414.

The second-stage washing process 306 is repeated in the fifth thickener 436, except that additional wash liquor 407 is introduced and mixed with underflow (stream 445) pumped from the fourth thickener 430 and the recycled overflow (stream 449A) from the fifth thickener split tank 438.

The inventive CCD wash process and circuit 400 could be utilized with other suitable industrial filtration devices either in place of or in combination with the clarifier thickeners, with the filtrates and residues advancing accordingly (e.g., serially or countercurrently).

The underflow (stream 451) forming the slurried enhanced manganese-zinc filter cake composition 451 can be directly sent (stream 453) to the manganese-zinc recovery process and circuit 3000. Alternatively, the slurried enhanced manganese-zinc filter cake composition 451 can be dewatered and/or dried in the final-stage dewatering and drying process circuit 308 before being routed to the mineral recovery process and circuit 3000.

The slurried enhanced manganese-zinc filter cake composition 451 can be dewatered in the final dewatering stage 308A using a batch or continuous dewatering device 440, (e.g., one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable dewatering device(s)) to produce a dewatered enhanced manganese-zinc filter cake composition (process streams 457 or 459) having between about 10% and about 60% (or between about 20% and about 45%) (or any value or range therebetween) by weight retained moisture.

The dewatered enhanced manganese-zinc filter cake composition can be either directly routed (process stream 457) to the mineral recovery process and circuit 3000 or can be routed (process stream 459) to be dried by a drying devices 442 in the final drying stage 308B to produce the dried enhanced manganese-zinc filter cake composition (process stream 461) having less than about 20% (or less than about 10% or between about 5% and about 10%) by weight retained moisture. Similar to the intermediate-stage drying process circuit 304, the drying device 442 can be a batch and/or continuous drying device, such as one or more convection ovens, rotary drum dryers, vacuum dryers, infrared dryers, belt dryers, flash dryers, fluidized bed dryers using steam heat, electric heat, gas-fired heat, recycled heat or hot air stream, or other suitable industrial drying device(s), which can be combined with a dryer baghouse. The drying conditions are selected to reduce the moisture content of the dried enhanced filter cake composition 461 to a target level, depending on downstream process requirements and material handling considerations. The drying device 442 can be configured to utilize recycled or waste heat or low-grade energy from other plant operations.

Figure 5:
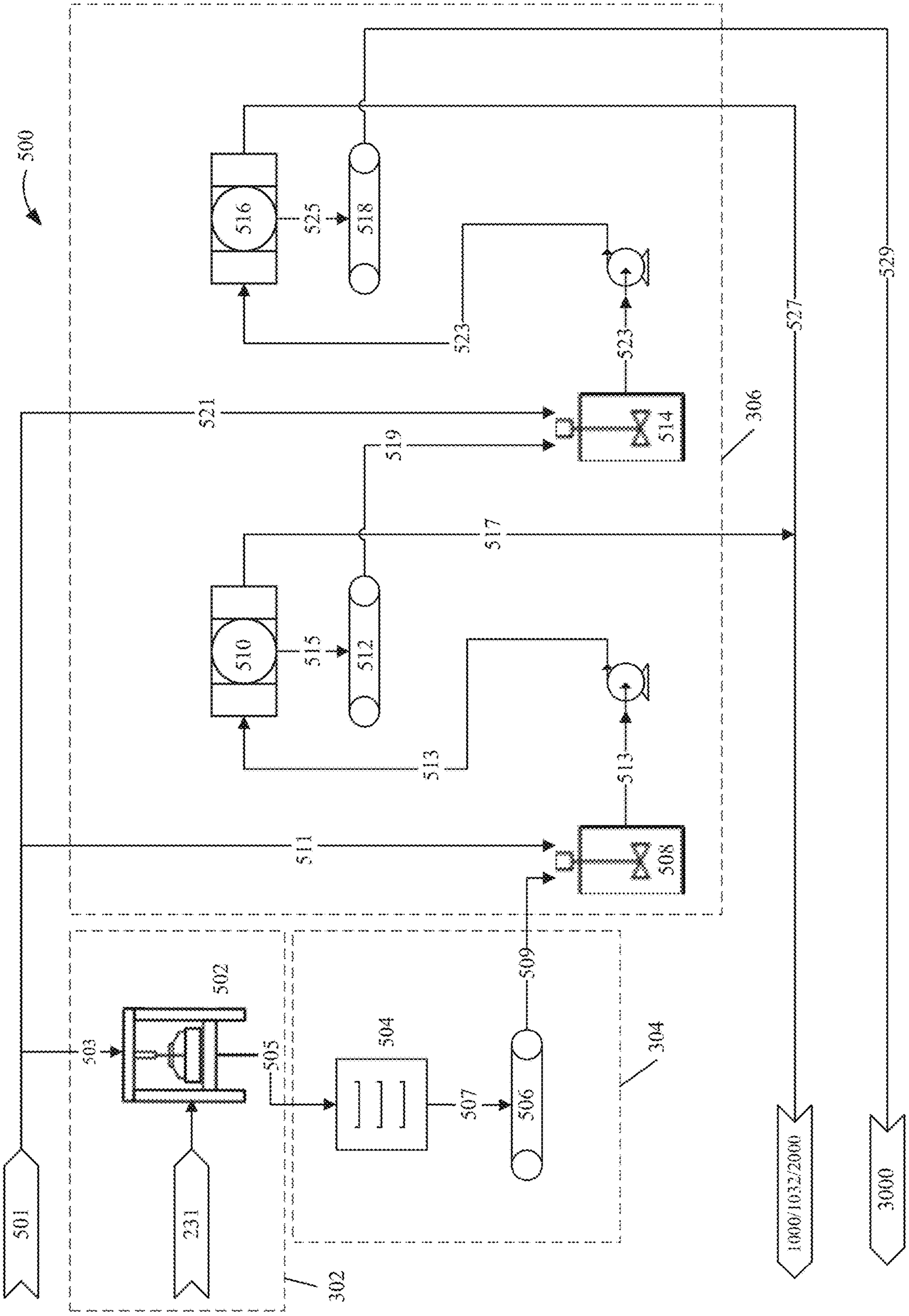
FIG. 5 is a process flow diagram of an example of a dual-repulp wash process circuit for producing a dewatered enhanced manganese-zinc filter cake composition in accordance with an illustrative embodiment of the invention disclosed herein.

FIG. 5 illustrates another exemplary embodiment of the invention as a dual-repulp process circuit 500 having a first-stage washing and dewatering process circuit 302, an intermediate-stage drying process circuit 304 downstream of the first-stage washing and dewatering process circuit 302, and a second-stage washing process circuit 304 downstream of the intermediate-stage drying process circuit 304. In this illustrative embodiment, the underflow slurry 231 is washed with one or more bed volumes of a repulping liquor 501 using one or more displacement washes (stream 503) before being dewatered using an intermittent or continuous dewatering device 502 (e.g., one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable dewatering device(s)) to produce a dewatered polymetallic oxide/hydroxide/oxychloride filter cake composition (process stream 505) having between about 10% and about 60% (or between about 20% and about 45%) (or any value or range therebetween) by weight retained moisture.

The dewatered polymetallic filter cake composition 505 is routed to a batch and/or continuous drying device 504, such as one or more convection ovens, rotary drum dryers, vacuum dryers, infrared dryers, belt dryers, flash dryers, fluidized bed dryers using steam heat, electric heat, gas-fired heat, recycled heat or hot air stream, or other suitable industrial drying device(s). The drying device 504 operates at a selected temperature and a selected residence time to weaken the chemical bonds between oxychloride in the dried filter cake matrix and to reduce the moisture content of the dried polymetallic filter cake composition 507 to an air-dry or oven-dry state, e.g., less than about 20% by weight, and preferably to less than about 5% by weight, where most, if not all, of the free moisture has been removed. The drying step may be performed continuously or in batch mode, and may be integrated with heat recovery systems or other plant operations to improve energy efficiency.

The dried polymetallic oxide/hydroxide/oxychloride filter cake composition (process stream 507) is then routed from the drying device 504 via a conveyor 506 or similar solids transport device (process stream 509) to a first repulp tank 508 where repulping liquor 511 is added to repulp the dried polymetallic filter cake composition 507 to produce a 15% to about 25% by weight slurry. The first repulp tank 508 can be any suitable repulping device, such as one or more tanks with an impeller, hydrapulpers, drum pulpers, or other suitable repulping device(s).

The slurry (stream 513) is pumped to a first intermittent or continuous filtration or dewatering device 510, such as one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable filtration or dewatering device(s), where the slurry 513 is dewatered to produce a dewatered manganese-zinc filter cake composition 515. For example, the slurry 513 can be dewatered at about 20 inches mercury (0.68 bar) of vacuum or at about 5.5 bar (80 PSI) to about 6.9 bar (100 PSI) pressure levels. The chloride-laden filtrate 517 from the first filter 510 can be recycled to the power plant 1000, the mineral extraction circuit 2000, and/or routed for reinjection 1032.

The dewatered polymetallic filter cake composition (process stream 515) can be routed from the first filter 510 to a first conveyor or similar solids transport device 512 to the manganese-zinc recovery process and circuit 3000, or as exemplified in the dual-repulp and filter circuit 500 of FIG. 5, routed to a second repulp tank 514 (stream 519) for reslurrying with repulping liquor 521. From the second repulp tank 514, the repulped slurry (stream 523) is pumped to a second batch or continuous filtration or dewatering device 516, such as one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable filtration or dewatering device(s), (e.g., using a horizontal vacuum belt filter at about 20 inches mercury (0.68 bar) of vacuum). The filter filtrate (stream 527) is recycled with the chloride-laden filtrate 517 back to a desired location at the power plant operations 1000 and/or the mineral extraction circuit 2000 or routed for reinjection 1032. The dewatered manganese-zinc filter cake composition 525 can then be routed from the second filter 516 to a second conveyor 518 or similar solids transport device (stream 529) to be sent for transport or to the manganese-zinc recovery process and circuit 3000. The inventive process and circuit may utilize more or fewer stages of repulping and dewatering than those illustrated.

Figure 6:
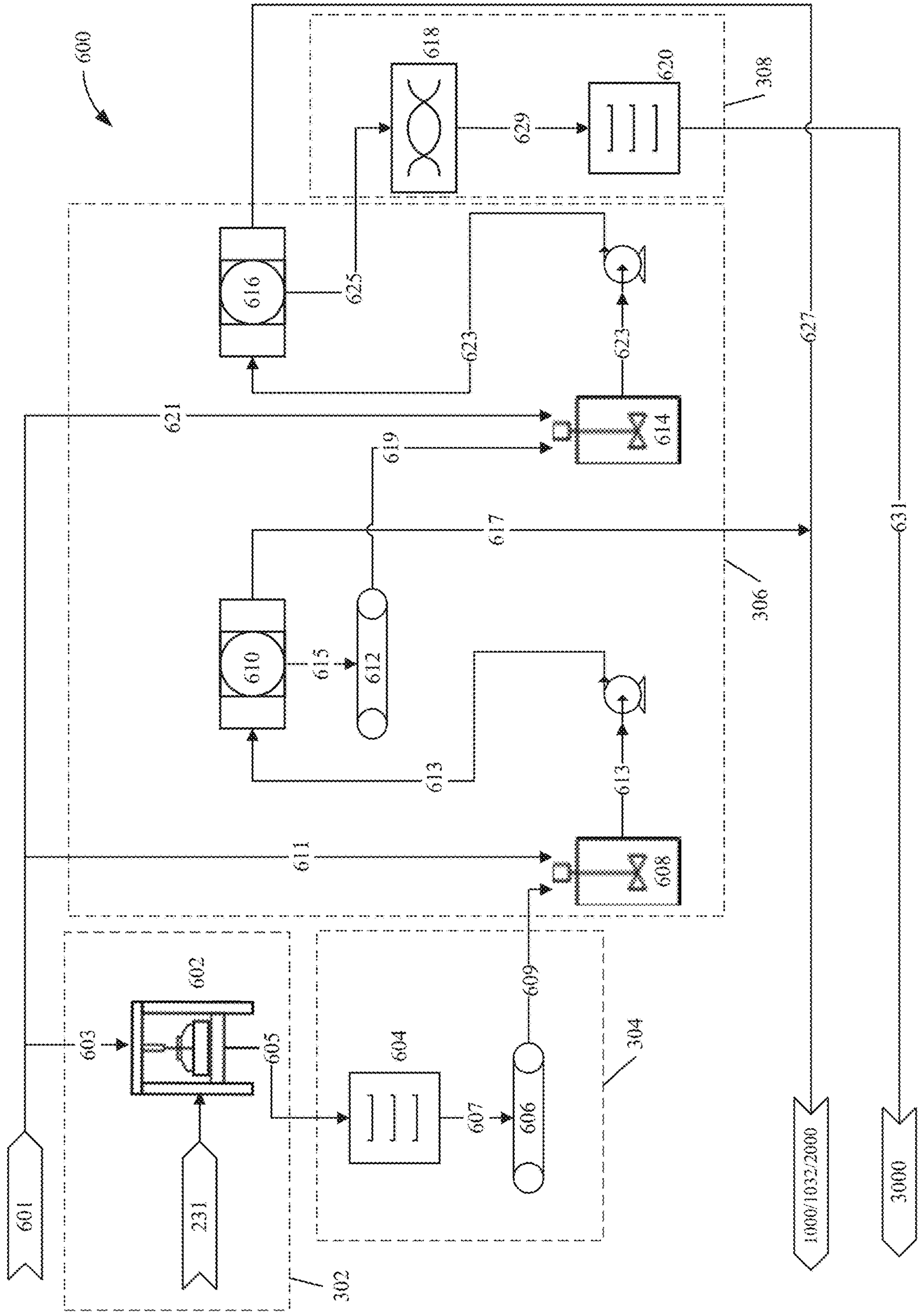
FIG. 6 is a process flow diagram of another example of a dual-repulp wash process circuit for producing a dried enhanced manganese-zinc filter cake composition in accordance with an illustrative embodiment of the invention disclosed herein.

FIG. 6 illustrates a dual-repulp wash process circuit 600 similar to the wash circuit 500 shown in FIG. 5, but with a final-stage drying process circuit 308. The underflow slurry 231 is washed with one or more bed volumes of a repulping liquor 601 using one or more displacement washes (stream 603) before being dewatered using a batch or continuous dewatering device 602 to produce a dewatered polymetallic oxide/hydroxide/oxychloride filter cake composition (process stream 605) having between about 10% and about 60% (or between about 20% and about 45%) (or any value or range therebetween) by weight retained moisture. The dewatering device 602 can be one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable dewatering device(s).

The dewatered polymetallic filter cake composition 605 from the dewatering device 602 is dried by a drying device 604 (e.g., a batch and/or continuous drying device, such as one or more convection ovens, rotary drum dryers, vacuum dryers, infrared dryers, belt dryers, flash dryers, fluidized bed dryers using steam heat, electric heat, gas-fired heat, recycled heat or hot air stream, or other suitable industrial drying device(s), which can be combined with a dryer baghouse) before being conveyed 606 to a first repulp tank 608 where repulping liquor 611 containing low chloride concentrations is added to repulp the dried polymetallic filter cake composition 607 into a 15% to about 25% by weight slurry. The slurried polymetallic filter cake composition (stream 613) is pumped from the repulp tank 608 to an intermittent or continuous filtration or dewatering device 610, such as one or more vacuum- or pressure-filters (e.g., membrane filter press, plate and frame filter press, pressure or vacuum nutsche filter, tube press, rotary drum vacuum, belt filter, rotary press, horizontal leaf, candle, and/or centrifuge) or other suitable filtration or dewatering devices, where the slurried polymetallic filter cake composition 613 is dewatered. As illustrated, the dewatered manganese-zinc filter cake composition (process stream 615) is routed from the dewatering device 610 using a conveyor 612 or similar solids transport device to a second repulp tank 614 for reslurrying with repulping liquor 621 and final chloride removal. The chloride-laden filtrate 617 from the filter 610 can be recycled to the power plant 1000, the mineral extraction circuit 2000, and/or routed for reinjection 1032. From the second repulp tank 614, the slurried manganese-zinc filter cake composition (steam 623) is pumped to a second filter or dewatering device 616. The chloride content of the slurried enhanced manganese-zinc filter cake composition (process stream 625) is reduced from approximately 15% down to about 0.5% by weight or less in the dewatered manganese-zinc filter cake composition 625 using the dual-repulp wash process and circuit 600. The filtrate (stream 627) is recycled with the chloride-laden filtrate 617 back to the power plant operations 1000 and/or the mineral extraction circuit 2000 or routed for reinjection 1032.

In the embodiment illustrated in FIG. 6, the dewatered manganese-zinc filter cake composition 625 from the second filter 616 can be dried in a drying device 620 to produce a dried manganese-zinc filter cake composition 631 having less than about 20% by weight (or less than about 10% or between about 5% and about 10% by weight) retained moisture. The drying device 620 can be any suitable industrial dryer for drying extruded, granular, or pelletized materials, such as a convection oven, a rotary drum dryer, a vacuum dryer, an infrared dryer, a belt dryer, a flash dryer, a fluidized bed dryer using steam heat, electric heat, gas-fired heat, recycled heat or hot air stream, or other suitable industrial drying device(s), which can be combined with recycled heat from a dryer baghouse. The dried manganese-zinc filter cake composition 631 can be shipped or routed to the mineral recovery process and circuit 3000 for sequentially recovering manganese and zinc products.

As shown in FIG. 6, the dewatered manganese-zinc filter cake composition 625 can be discharged from the dewatering device 616 to a forming and/or processing device 618, such as an agglomeration, casting, rolling, extrusion, granulation, pelletizing, or a combination thereof device(s), before being dried in the drying device 620. By way of non-limiting examples, the dewatered manganese-zinc filter cake composition 625 can be agglomerated using one ore more industrial mixer devices, such as paddle, ribbon, plow, tumbler, and/or drum mixers, extruded using one or more industrial extruder devices, such as screw and/or ram extruding devices, granulated using one or more one or more industrial granulator devices, such as oscillating, extrusion, fluidized bed, and/or sheer granulator devices, pelletized using one or more industrial pelletizer devices, such as disc, drum, strand, or fluidized bed pelletizer devices, or a combination thereof. The shaped and/or processed cake composition (process stream 629) is then fed into the drying device 620, where the particle size is between 100 microns and 4 inches, depending on end-use requirements. The dried manganese-zinc filter cake composition 631 can be loaded into a truck or railcar and/or bagged for shipment for further processing or routed to the mineral recovery process and circuit 3000. The inventive process and circuit may utilize more or fewer stages of washing, repulping, dewatering, and/or drying than those illustrated.

EXAMPLES

The process for producing the enhanced manganese-zinc filter cake composition is further illustrated by the following examples, in addition to the examples provided in U.S. patent application Ser. No. 19/088,985, which, as noted above, are each incorporated by reference in their entirety into this document as if fully set out at this point. The following examples and the incorporated by reference examples are each provided for demonstration rather than limitation.

Example 1

An experimental program was conducted to evaluate the impact of an intermediate drying step, as well as other process parameters, on the efficiency of chloride removal from polymetallic oxide/hydroxide/oxychloride filter cake compositions. In this example, filter cake samples were first generated by precipitating manganese and zinc from a representative saline feedstock and then dewatering the resulting solids using a pressure filtration device. The dewatered filter cake composition, which initially exhibited a moisture content of approximately 50% by weight and retained significant levels of soluble chloride salts, was divided into several test portions for comparative analysis.

Figure 7:
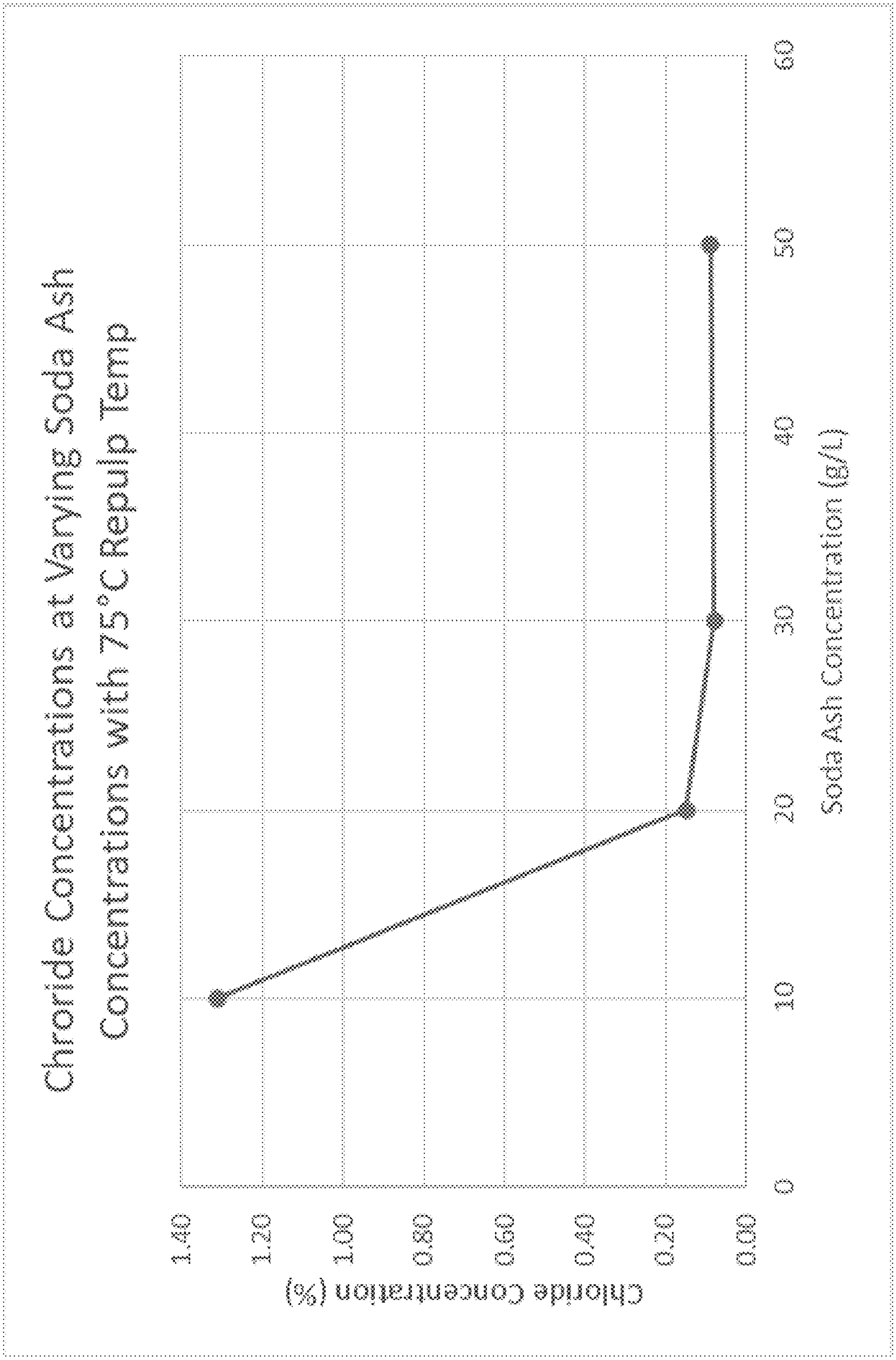
FIG. 7 is a graph depicting the effect of alkali or basic reagent (i.e., sodium carbonate) concentration on chloride removal from the filter cake composition.

FIG. 7 is a graph illustrating the relationship between an alkali reagent, namely, sodium carbonate (i.e., soda ash), concentration and the extent of chloride removal from the filter cake composition during washing. The graph displays results from four wash tests, each performed under identical conditions except for the concentration of soda ash. The data demonstrates that increasing the alkali reagent, namely soda ash, concentration up to approximately 30 g/L results in improved chloride removal; however, concentrations above this threshold do not appear to yield further significant reductions in chloride content, indicating a plateau effect, where additional soda ash beyond 30 g/L would not provide any incremental benefit for chloride extraction.

Figure 8:
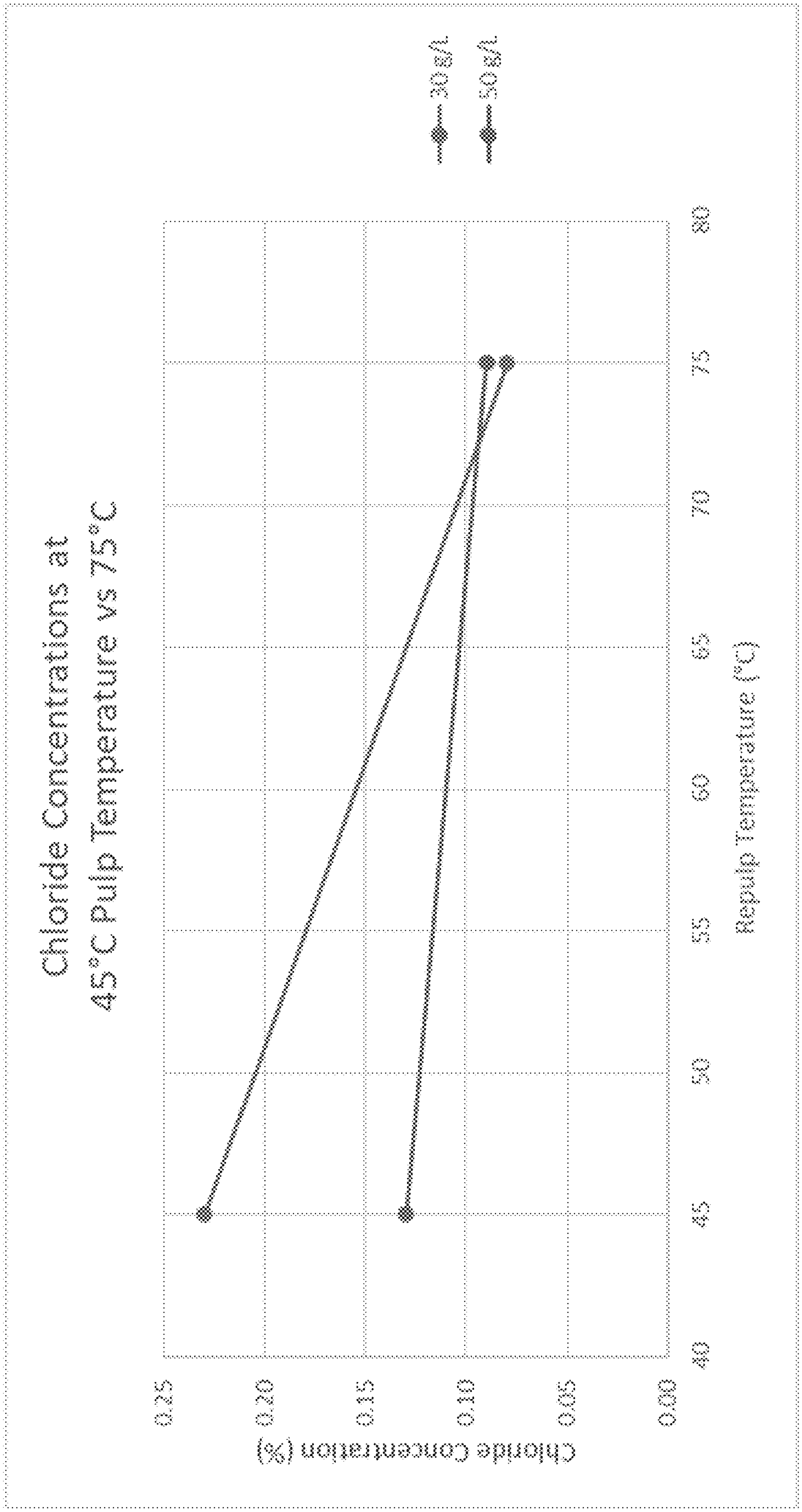
FIG. 8 is a graph depicting the effect of temperature on chloride removal at two soda ash concentrations.

FIG. 8 depicts the results of four wash tests performed at soda ash concentrations of 50 g/L or 30 g/L, with the temperature varied between the tests. The pulp/repulp temperatures were maintained in the initial feed and both repulp stages. For instance, the 45° C. test used a 45° C. pressure filtration device feed temperature, first repulp temperature, and second repulp temperature. Washing was performed with 55° C. water for the pressure filtration device displacement wash and 25° C. water for both repulp displacement washes in all instances. The graph demonstrates that higher temperatures in the repulp stages lead to improved chloride removal from the filter cake composition. The data suggests that temperature has a positive effect on chloride extraction, particularly at lower soda ash concentrations, and that increased solution temperature can compensate for less favorable reaction kinetics at lower temperatures. At a fixed soda ash concentration of 30 g/L, the increased temperature appears to offer some additional benefit in comparison to the 50 g/L test; however, the increased soda ash may be compensating for poor kinetics at the lower temperature.

Figure 9:
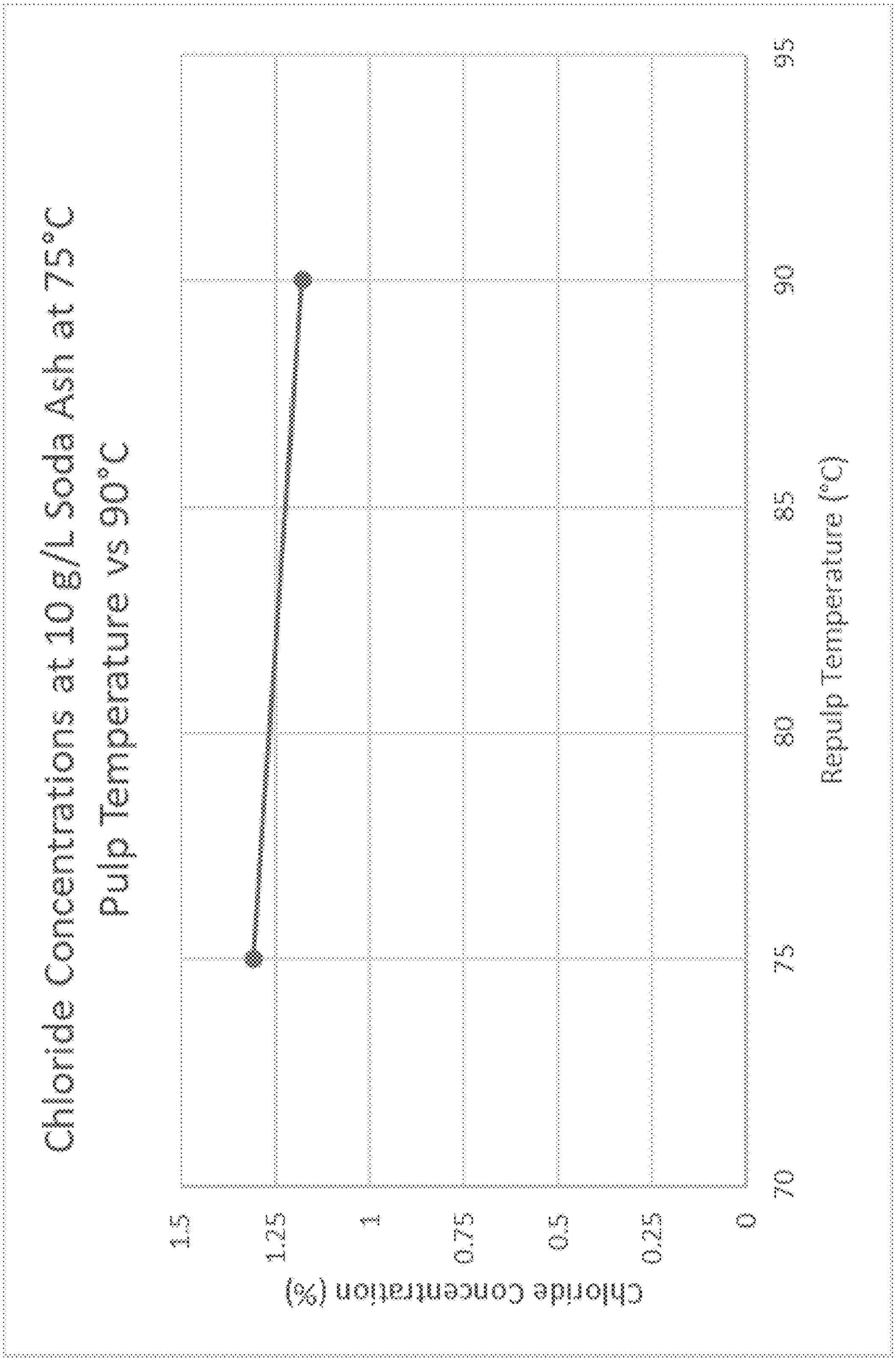
FIG. 9 is a graph comparing the effect of washing at 90° C. versus 75° C. on chloride removal.

FIG. 9 depicts the results of a wash test conducted at an elevated temperature of 90° C., which is above the typical operating range for several standard dewatering equipment technologies. FIG. 9 compares the chloride removal efficiency at this high temperature to that achieved at lower temperatures, and the results indicate that washing at 90° C. provides an additional improvement in chloride removal of about a 10% increase over the lower temperature test. FIG. 9 demonstrates that higher temperatures can further enhance the extent to which chloride is released from the filter cake composition.

Figure 10:
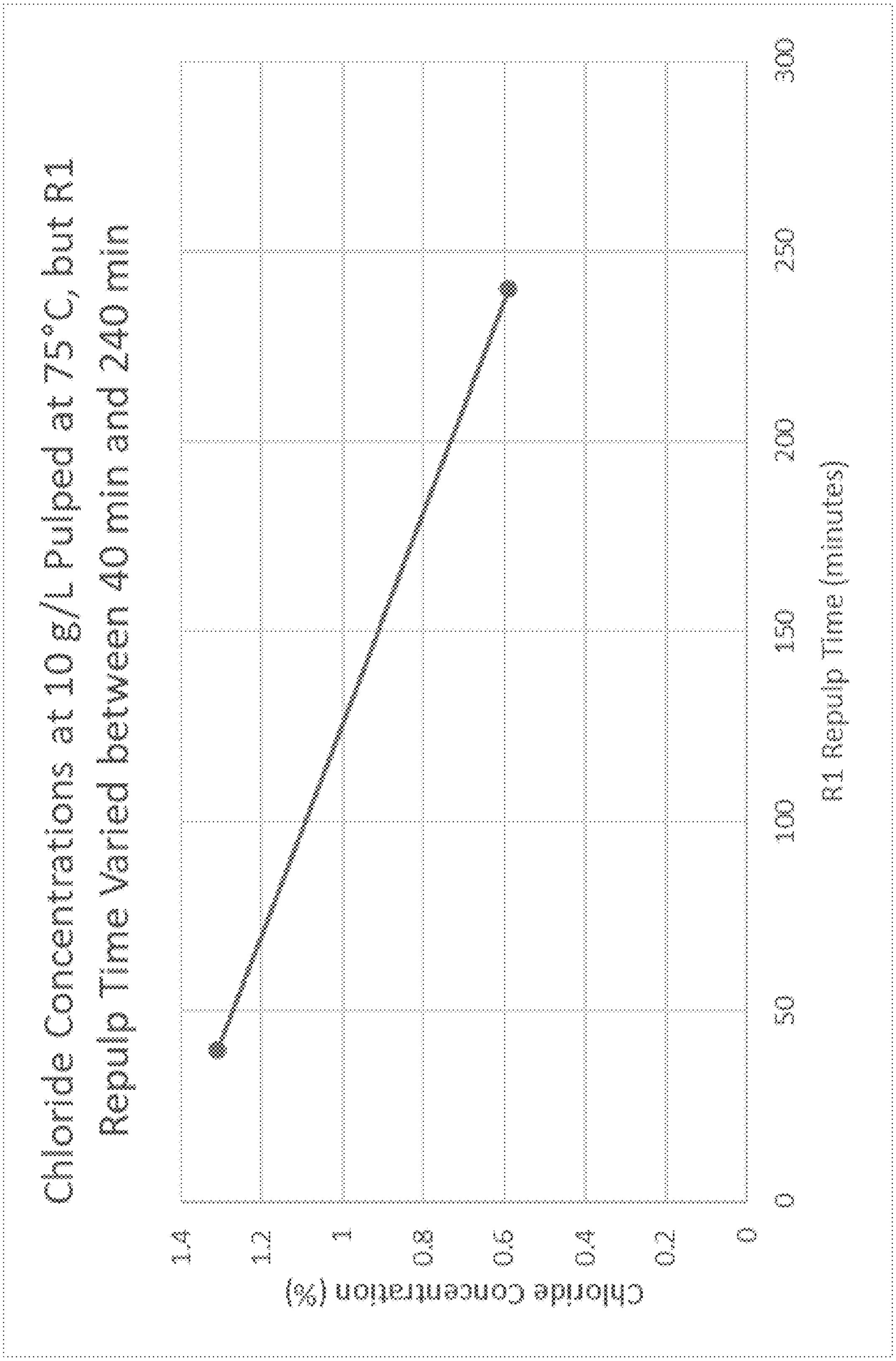
FIG. 10 is a graph depicting the effect of residence (reaction) time in the first repulp stage on the final chloride concentration.

FIG. 10 depicts the results of two wash tests to evaluate the impact of residence (reaction) time in the first repulp stage. FIG. 10 shows that increasing the first repulp time from 40 minutes to four hours results in a 55% reduction in final chloride concentration, corresponding to an additional 0.7 percentage point decrease. This finding highlights the importance of sufficient reaction time for effective chloride removal, as longer residence times allow for more thorough dissolution and migration of chloride ions from the filter cake matrix.

Figure 11:
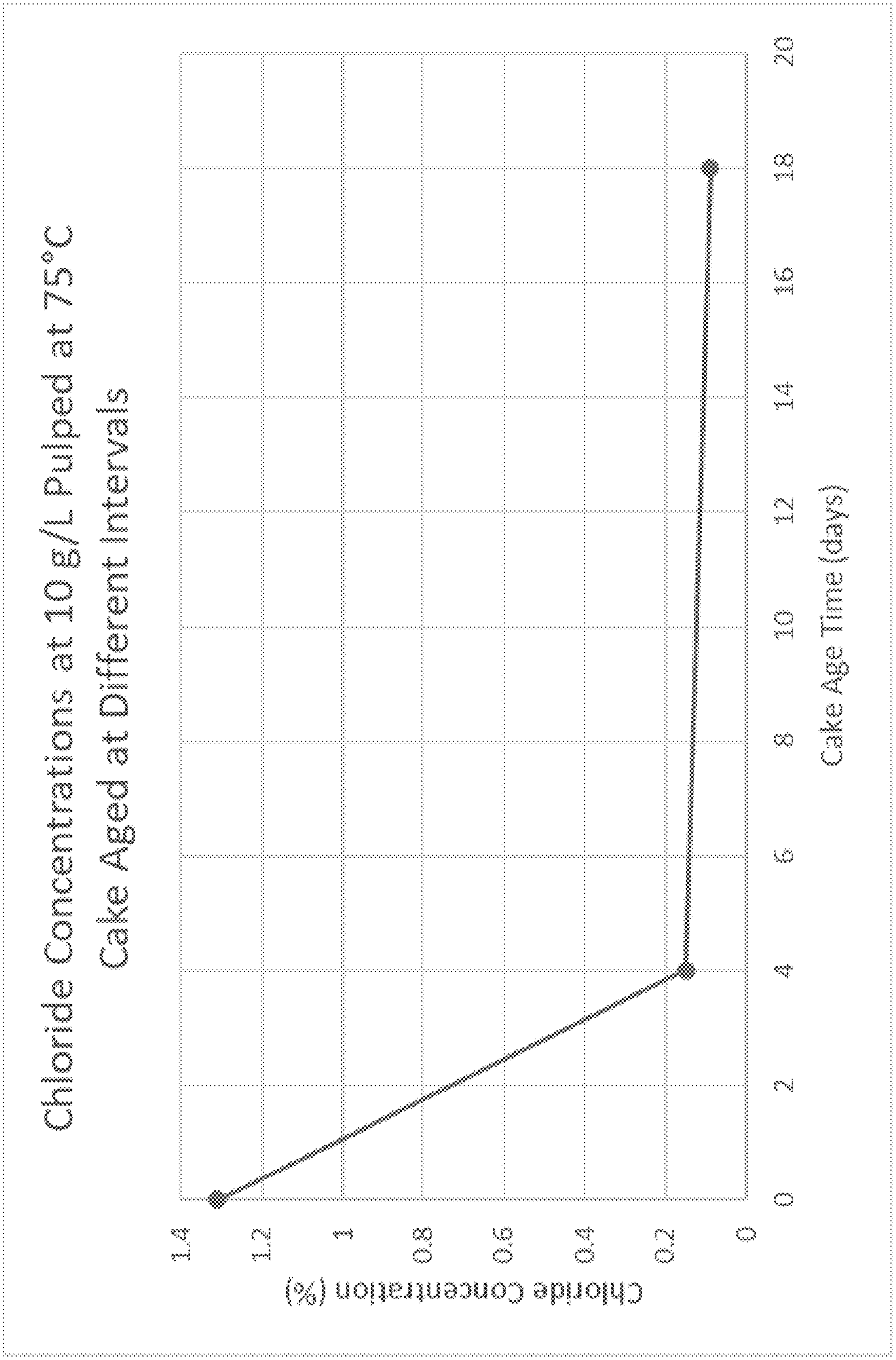
FIG. 11 is a graph depicting the effect of aging on a cake initially water-washed to remove a portion of soluble chlorides, prior to final (post-aging) washing, on the final chloride concentration.

FIG. 11 displays the results of two tests evaluating the impact of aging a dewatered polymetallic oxide/hydroxide/oxychloride filter cake composition in its solid form (approximately 10 mm thick) after an initial displacement wash (e.g., first-stage washing and dewatering process circuit 302) to remove soluble chlorides but before subsequent drying (e.g., intermediate-stage drying process circuit 304) and washing (e.g., second-stage washing process circuit 306) to remove resolubilized oxychlorides. FIG. 11 demonstrates that aging the filter cake composition for four days leads to a marked improvement in chloride removal, with an 89% reduction in chloride content compared to the unaged sample. Aging for eighteen days provides some additional benefit, but the improvement is less pronounced than that observed after the initial four days. These findings indicate that aging the filter cake composition in solid form, rather than as a slurry, can significantly enhance the efficiency of chloride extraction during subsequent washing.

Overall, the experiments in Example 1 confirm that the combination of an intermediate drying step and optimized residence time in the repulp stage(s) can dramatically enhance the removal of chloride from the enhanced manganese-zinc filter cake compositions. These findings support the technical advantages and process flexibility of the inventive approach, enabling the production of enhanced manganese-zinc filter cake compositions (slurried, dewatered, or dried) with low residual chloride content and improved suitability for downstream metal recovery.

For the purposes of this disclosure, the term "at least" followed by a number is used herein to denote the start of a range beginning with that number (which may be a range with an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

As used herein, the term "fluidly connected" means connected by a fluid transfer conduit or any other method that permits fluid transfer, with or without intervening elements, such as, without limitation, containers, filters, devices, pumps, valves, etc. A non-limiting example, two tanks or vessels may be "fluidly connected" if they are connected to each other through a pipe or tube, even if a pump, manifold, valve, or other device is placed inline between the vessels. Two elements are considered to be "fluidly connected" even though there is no pipe or tubing making the connection if the first element leaks or otherwise drains, overflows, siphons, or transfers into the second element, though there may be no actual physical connection between the two elements in the form of a pipe or tube.

As used herein, the term "in fluid communication with" means that a fluid-carrying or fluid-transporting member (e.g., vessel, tank, pump, pipe, tubing, disc, valve, channel, port, etc.) is coupled to another fluid-carrying or fluid-transporting member so as to permit the fluid to flow, leak, or otherwise migrate from one member to the other. In reference to a process or circuit, the term "downstream" means later in the direction of general process and/or fluid flow, and "upstream" means earlier in the direction of general process and/or flow.

Although an overview of the disclosed subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A process for producing an enhanced manganese-zinc filter cake composition, the process comprising steps of:

washing and dewatering a mixed polymetallic filter cake composition derived from a saline feedstock with a wash liquor to produce a dewatered polymetallic filter cake composition, the mixed polymetallic filter cake composition comprising oxides, hydroxides, chloride salts, or a combination thereof, the mixed polymetallic filter cake composition further comprising an initial concentration of manganese and zinc and an initial concentration of oxychloride salts;

drying the dewatered polymetallic filter cake composition in a drying device to reduce a moisture content and to increase a water solubility of the oxychloride salts in the dewatered polymetallic filter cake composition to produce a dried polymetallic filter cake composition; and washing the dried polymetallic filter cake composition with a repulping liquor to produce an enhanced manganese-zinc filter cake composition having an enhanced concentration of manganese and zinc and a reduced concentration of chloride salts.

2. The process of claim 1, wherein the saline feedstock is a geothermal brine, continental brine, oil field or produced water, salt lake brine, mining process water, tailings pond water, salar or evaporite basin brine, desalination brine concentrate, industrial saline wastewater, or a combination or blend thereof.

3. The process of claim 1, wherein the drying device is one or more batch and/or continuous convection ovens, rotary drum dryers, vacuum dryers, infrared dryers, belt dryers, flash dryers, fluidized bed dryers using steam heat, electric heat, gas-fired heat, recycled heat or hot air stream, or other industrial drying device(s).

4. The process of claim 1, further comprising a step of selecting at least one process parameter of cake thickness, repulp and/or wash liquor flow rate, repulp and/or wash liquor temperature, residence time, mixing intensity, repulp and/or wash stage configuration, or a combination thereof to enhance the reduced concentration of chloride salts.

5. The process of claim 4, wherein the drying step is performed at a predetermined-temperature sufficient to air-dry or oven-dry the dewatered polymetallic filter cake composition until the dried polymetallic filter cake composition reaches a predetermined-moisture content, where most, if not all, of the free moisture has been removed.

6. The process of claim 5, wherein the drying step is performed at a temperature between about 60° C. and about 120° C. for the residence time of between about 2 hours and about 24 hours.

7. The process of claim 6, wherein the drying step is performed at a temperature between about 90° C. and about 110° C. for the residence time of between about 4 hours and about 12 hours.

8. The process of claim 1, wherein the step of washing the dried polymetallic filter cake composition further comprises the steps of:

repulping the dried polymetallic filter cake composition with a first repulping liquor to form a slurried polymetallic filter cake composition; and washing the slurried polymetallic filter cake composition with a second repulping liquor to produce an enhanced manganese-zinc filter cake composition.

9. The process of claim 8, wherein the repulping step is performed at a temperature between about 30° C. and about 95° C. and/or for a residence time of about 20 minutes to about 8 hours.

10. The process of claim 9, wherein the repulping step is performed at a temperature between about 55° C. and about 95° C. and/or for a residence time of about 40 minutes to about 4 hours.

11. The process of claim 1, further comprising the steps of:

dewatering the enhanced manganese-zinc filter cake composition in a dewatering device to produce a dewatered enhanced manganese-zinc filter cake composition having the enhanced concentration of manganese and zinc and the reduced concentration of chloride salts; and/or drying the enhanced manganese-zinc filter cake composition, the dewatered enhanced manganese-zinc filter cake composition, or both in a drying device to produce a dried enhanced manganese-zinc filter cake composition having the enhanced concentration of manganese and zinc and the reduced concentration of chloride salts.

12. An enhanced manganese-zinc filter cake composition produced by the process of claim 1, the enhanced manganese-zinc filter cake composition comprising:

between about 36 weight percent and about 45 weight percent manganese;

between about 15 weight percent and about 17 weight percent zinc; and less than about 3 weight percent chloride.

13. The enhanced manganese-zinc filter cake composition of claim 12, wherein the chloride concentration is between about 1 weight percent and about 2 weight percent.

14. The enhanced manganese-zinc filter cake composition of claim 13, wherein the chloride concentration is between about 1.5 weight percent and about 1.7 weight percent.

15. The enhanced manganese-zinc filter cake composition of claim 12, wherein the chloride concentration is less than about 1.5 weight percent.

16. The enhanced manganese-zinc filter cake composition of claim 15, wherein the chloride concentration is between about 0.05 weight percent and about 0.25 weight percent.

17. The enhanced manganese-zinc filter cake composition of claim 12, further comprising up to about 1 weight percent aluminum and/or up to about 1 weight percent iron.

18. A circuit for producing an enhanced manganese-zinc filter cake composition, the circuit comprising:

a first-stage washing and dewatering process circuit configured to receive a mixed polymetallic filter cake composition derived from a saline feedstock and to produce a dewatered polymetallic filter cake composition, the first-stage washing and dewatering process circuit comprising:

a first washing stage configured to wash the mixed polymetallic filter cake composition with a wash liquor; and a first dewatering stage comprising a filtration or dewatering device configured to produce the dewatered polymetallic filter cake composition;

an intermediate-stage drying process circuit downstream of the first-stage washing and dewatering process circuit and configured to increase a water solubility of oxychloride salts in the dewatered polymetallic filter cake composition to produce a dried polymetallic filter cake composition, the intermediate-stage drying process circuit comprising a drying device; and a second-stage washing process circuit downstream of the intermediate-stage drying process circuit and configured to repulp and wash the dried polymetallic filter cake composition with a repulping liquor to produce an enhanced manganese-zinc filter cake composition having an enhanced concentration of manganese and zinc, a reduced concentration of chloride salts, and a reduced concentration of oxychloride salts.

19. The circuit of claim 18, wherein the filtration or dewatering device in the first dewatering stage comprises one or more batch or continuous vacuum- or pressure-filters.

20. The circuit of claim 18, wherein the drying device in the intermediate-stage drying process circuit comprises one or more batch and/or continuous convection ovens, rotary drum dryers, vacuum dryers, infrared dryers, belt dryers, flash dryers, fluidized bed dryers using steam heat, electric heat, gas-fired heat, recycled heat or hot air stream, or other industrial drying device(s).

21. The circuit of claim 18, wherein the first-stage washing and dewatering process circuit and the second-stage washing process circuit each comprise a displacement wash process circuit, a repulp wash process circuit, a countercurrent decantation process circuit, or a combination thereof.

22. The circuit of claim 18, wherein the second-stage washing process circuit is configured to repulp and wash the dried polymetallic filter cake composition with the repulping liquor comprising water, an alkali selected from the group consisting of sodium carbonate, potassium carbonate, calcium carbonate, sodium hydroxide, potassium hydroxide, calcium hydroxide, lithium hydroxide, and ammonium hydroxide, or a combination or mixture thereof.

23. The circuit of claim 18, further comprising a final-stage dewatering and drying process circuit downstream of the second-stage washing process circuit, and the final-stage dewatering and drying process circuit comprising:

a final dewatering stage comprising a filtration or dewatering device configured to produce a dewatered enhanced manganese-zinc filter cake composition having the enhanced concentration of manganese and zinc and the reduced concentration of chloride salts; and/or a final drying stage downstream of the final dewatering stage and comprising a drying device configured to produce a dried enhanced manganese-zinc filter cake composition having the enhanced concentration of manganese and zinc and the reduced concentration of chloride salts.

24. The circuit of claim 23, wherein the filtration or dewatering device in the final dewatering stage comprises one or more batch or continuous vacuum- or pressure-filters, and wherein the drying device in the final drying stage comprises one or more batch and/or continuous convection ovens, rotary drum dryers, vacuum dryers, infrared dryers, belt dryers, flash dryers, fluidized bed dryers using steam heat, electric heat, gas-fired heat, recycled heat or hot air stream, or other industrial drying device(s).

25. The process of claim 1, wherein washing the dried polymetallic filter cake composition removes oxychloride salts solubilized by the drying step to produce the enhanced manganese-zinc filter cake composition having a reduced concentration of oxychloride salts.

26. The enhanced manganese-zinc filter cake composition of claim 12, wherein the enhanced manganese-zinc filter cake composition has a reduced oxychloride salt concentration relative to the mixed polymetallic filter cake composition before the drying step.

* * * * *